(12) United States Patent
Kassai et al.

(10) Patent No.: US 6,481,794 B1
(45) Date of Patent: Nov. 19, 2002

(54) CHILD SAFETY CAR SEAT, PROTECTOR, PROTECTOR FOR CHILD-CARE INSTRUMENT, CHILD-CARE INSTRUMENT AND BED FOR A NEWBORN

(75) Inventors: Kenzou Kassai; Ichiro Onishi; Fumiko Takahashi, all of Osaka (JP)

(73) Assignee: Aprica Kassai Kabushikikaisha, Osaka (JP)

( * ) Notice: Subject to any disclaimer, the term of this patent is extended or adjusted under 35 U.S.C. 154(b) by 0 days.

(21) Appl. No.: 09/496,151

(22) Filed: Feb. 1, 2000

(30) Foreign Application Priority Data

Feb. 8, 1999 (JP) .......................... 11-030500
Oct. 20, 1999 (JP) .......................... 11-298309

(51) Int. Cl.$^7$ ................................ B60N 2/28
(52) U.S. Cl. ..................... 297/250.1; 297/219.12; 297/410; 297/484; 297/467
(58) Field of Search ............... 297/219.12, 250.1, 297/467, 484, 410

(56) References Cited

U.S. PATENT DOCUMENTS

| | | | | |
|---|---|---|---|---|
| 2,625,987 A | * | 1/1953 | Hunter | 297/250.1 |
| 4,383,713 A | * | 5/1983 | Roston | 297/219.12 |
| 4,770,468 A | * | 9/1988 | Shubin | 297/467 |
| 5,098,157 A | * | 3/1992 | Surot | 297/250.1 |
| 5,286,090 A | * | 2/1994 | Templin | 297/250.1 |
| 5,310,245 A | * | 5/1994 | Lysczcasz | 297/219.12 |
| 5,645,317 A | | 7/1997 | Onishi et al. | |
| 5,916,089 A | * | 6/1999 | Ive | 297/219.12 |
| 5,964,502 A | * | 10/1999 | Stephens | 297/484 |
| 6,030,047 A | * | 2/2000 | Kain | 297/250.1 |
| 6,045,183 A | * | 4/2000 | Weber | 297/250.1 |

FOREIGN PATENT DOCUMENTS

TW 280270 7/1996

* cited by examiner

Primary Examiner—Peter R. Brown
(74) Attorney, Agent, or Firm—W. F. Fasse; W. G. Fasse

(57) ABSTRACT

A safety car seat for a child is provided with a headrest vertical moving device, a shoulder belt position control device, a sleeping support position control device, a crotch belt position control device, a footrest step position control device and a moving device for changing the capacity of a support space for protecting the brain, the back and respiration of a child in the seat. By employing this mechanism, it is possible to provide a juvenile safety car seat enabling implementation of comfortability and safeness as well as protection of the brain, the neck and respiration of a baby based on medical criteria for the baby.

8 Claims, 39 Drawing Sheets

CHILD SAFETY CAR SEAT, PROTECTOR, PROTECTOR FOR CHILD-CARE INSTRUMENT, CHILD-CARE INSTRUMENT AND BED FOR A NEWBORN

BACKGROUND OF THE INVENTION

1. Field of the Invention

The present invention relates to a technique for changing the capacity of a space for supporting a juvenile whose body is in the process of growth, and more particularly, it relates to a technique for enabling a bed state optimum for a baby based on medical criteria in a neonatal period, infancy or childhood.

2. Description of the Prior Art

The most important factors of a child-care instrument are excellent safeness and comfortability for a juvenile or child. Among child-care instruments, particularly a child safety car seat employed in a car must be comfortable and assure a high safety in supporting a child in a proper state responsive to the growth of the child.

A neonate grows into an infant, a child and a school child, and its habitus or growth changes in this process. Therefore, the juvenile safety car seat must change the space for supporting the juvenile in response to the change of its habitus for regularly providing an optimum space responsive to the growth of the child. Further, it is extremely important to protect the brain, the neck and respiration of the juvenile, particularly a neonate or an infant whose brain is in a developmental stage.

SUMMARY OF THE INVENTION

An object of the present invention is to provide a juvenile safety car seat capable of providing optimum comfortability and safeness for a child with due regard to the growth stage of the child's body.

Another object of the present invention is to provide a child safety car seat improved for easy handling.

Still another object of the present invention is to provide a safety car seat improved in safety on the basis of an improved attachability to a seat of a car.

A further object of the present invention is to provide a protector capable of providing optimum comfortability and safeness for a child with due regard to the growth stage of the child's body, particularly a protector enabling protection with a multilayer structure for a child whose brain is in a developmental stage.

A further object of the present invention relates to a child-care instrument and a bed for a neonate enabling a bed state optimum for a baby based on medical criteria in a neonatal period, infancy or childhood.

The child safety seat according to the present invention provides a child safety seat adapted to be secured to a car seat by a seat belt provided on said car seat, said child safety seat comprising a seat body including a backrest for supporting a child's back, a headrest movably supported by said seat body, said headrest including a head guard wall rising from a plane of said headrest for protecting the top of the head of a child in said safety seat, and headrest moving means operatively connected to said headrest for controlling a position of said headrest including said head guard wall relative to said backrest.

Thus, it is possible to protect the juvenile with a capacity responsive to its growth. Consequently, the child safety car seat has been improved for comfort and safety of the entire child.

In the aforementioned aspect, the capacity-variable device preferably has a head space control device for changing the capacity of a head space that is part of the support space, in response to growth of the head of the child.

Thus, it is possible to protect the head of the child with a capacity responsive to growth of the child. Consequently, the child safety car seat can be improved in comfortability and safeness for the head of the child. The term "juvenile" is used herein as a synonym for "child".

In order to implement the aforementioned aspect in a more preferable state, the following structures are employed:

More preferably, the aforementioned head space control device includes a head guard for protecting the head of a juvenile and a head guard vertical position control device for controlling the vertical position of the head guard with respect to the head position of the juvenile.

More preferably, the aforementioned head space control device includes a head guard provided substantially above a backrest portion of the aforementioned juvenile safety car seat and a head guard attachment angle control device for controlling the angle of attachment of the head guard with respect to the aforementioned backrest portion, in order to protect the head of the juvenile.

More preferably, the aforementioned head space control device includes a pair of side guards for protecting the lateral surfaces of the head of the juvenile and a side guard vertical position control device for controlling the vertical positions of the aforementioned pair of side guards with respect to the head position of the juvenile.

More preferably, the aforementioned head space control device includes a pair of side guards for protecting the lateral surfaces of the head of the juvenile and a side guard space control device changing the space between the aforementioned pair of side guards.

More preferably, the aforementioned head space control device includes a pair of side guards for protecting the lateral surfaces of the head of the juvenile and a side guard attaching and/or detaching device rendering the aforementioned pair of side guards attachable to and/or detachable from the aforementioned juvenile safety car seat.

More preferably, the aforementioned head space control device includes a head guard and a pair of side guards for protecting the head of the juvenile, a coupling member for coupling the aforementioned head guard and the aforementioned pair of side guards with each other, and a coupling member vertical position control device for controlling the vertical position of the aforementioned coupling member with respect to the head position of the juvenile.

More preferably, the aforementioned head space control device includes a head protector arranged in a clearance defined between the aforementioned head space forming part of the aforementioned support space and the head of the juvenile for forming a head receiving space.

In the aforementioned aspect, the aforementioned capacity-variable device has a shoulder space control device changing the capacity of a shoulder region of the aforementioned support space in response to growth of the shoulders of the juvenile.

Thus, it is possible to protect the shoulders of the juvenile with a capacity responsive to growth of the juvenile. Consequently, the juvenile safety car seat can be improved in comfortability and safeness for the shoulders of the juvenile.

In order to implement the aforementioned aspect in a more preferable state, the following structures are employed:

More preferably, the aforementioned shoulder space control device includes a safety belt having a shoulder belt located on the shoulder of the juvenile and a shoulder belt vertical position control device for controlling the vertical position of the aforementioned shoulder belt with respect to the shoulder position of the juvenile.

More preferably, the aforementioned shoulder space control device includes a safety belt having a shoulder belt located on the shoulder of the juvenile and a shoulder belt width position control device for controlling the position of the shoulder belt in the width direction with respect to the shoulder position of the juvenile.

More preferably, the aforementioned shoulder space control device includes a safety belt having a shoulder belt located on the shoulder of the juvenile and a shoulder belt inclination control device for controlling inclination of the aforementioned shoulder belt with respect to the shoulder position of the juvenile.

More preferably, the aforementioned shoulder space control device includes a shoulder protector arranged in a clearance defined between the aforementioned shoulder region of the aforementioned support space and the shoulder of the juvenile for forming a shoulder receiving space.

In the aforementioned aspect, the aforementioned capacity-variable device preferably has an abdominal space control device changing the capacity of an abdominal region of the aforementioned support space in response to growth of the abdominal region of the juvenile.

Thus, it is possible to protect the abdominal region of the child with a capacity responsive to growth of the juvenile. Consequently, the present child safety car seat is improved in comfortability and safety for the abdominal region of the juvenile.

In order to implement the aforementioned aspect in a more preferable state, the following structures are employed:

More preferably, the abdominal space control device includes a safety belt having a crotch belt located on the crotch of the juvenile and a crotch belt horizontal position control device for controlling the horizontal position of the aforementioned crotch belt with respect to the abdominal position of the juvenile.

More preferably, the abdominal space control device includes a safety belt having a crotch belt located on the crotch of the juvenile and a crotch belt vertical position control device for controlling the vertical position of the aforementioned crotch belt with respect to the abdominal position of the juvenile.

More preferably, the aforementioned abdominal space control device includes a safety belt having a crotch belt located on the crotch of the juvenile and a crotch belt inclination control device for controlling inclination of the aforementioned crotch belt with respect to the abdominal position of the juvenile.

More preferably, the aforementioned abdominal space control device includes an abdominal protector arranged in a clearance defined between the aforementioned abdominal region of the aforementioned support space and the abdomen of the juvenile for forming an abdomen receiving space.

More preferably, the aforementioned abdominal space control device includes a crotch belt protector attached to the aforementioned crotch belt to fill up a clearance between the crotch of the juvenile and the aforementioned crotch belt.

In the aforementioned aspect, the capacity-variable device preferably has a leg space control device changing the capacity of a leg region of the aforementioned support space in response to growth of the legs of the juvenile.

Thus, it is possible to protect the legs of the juvenile with a capacity responsive to growth of the juvenile. Consequently, the present child safety car seat is improved in comfortability and safeness for the legs of the juvenile.

In order to implement the aforementioned aspect in a more preferable state, the following structures are employed:

More preferably, the aforementioned leg space control device includes a footrest step located under the feet of the juvenile and a footrest, located under the legs of the juvenile, provided to be horizontally slidable.

More preferably, the aforementioned leg space control device includes a leg protector arranged in a clearance defined between the aforementioned leg region of the aforementioned support space and the legs of the juvenile for forming a leg receiving space.

A juvenile safety car seat according to another aspect of the present invention, which is fixed to a seat of a car with a seat belt provided on the seat of the car, comprises a seat body receiving the juvenile, a base supporting the aforementioned seat body from below to be rotatable and backwardly inclinable, a rotational position locking device locking the aforementioned seat body to a rotational position with respect to the aforementioned base, a backward inclination angle locking device locking the aforementioned seat body at an angle of backward inclination with respect to the aforementioned base, and a locking release device supported by the aforementioned base to simultaneously release the seat body from locking by the aforementioned rotational position locking device and locking by the aforementioned backward inclination angle locking device.

Thus, the rotational position locking device and the backward inclination angle locking device can be handled with the single locking release device. The position of the locking release device, which is provided on the seat body, remains unchanged after the juvenile safety car seat is attached to the seat of the car. Consequently, handleability of the rotational position locking device and the backward inclination angle locking device has been improved.

In order to implement the aforementioned aspect in a more preferable state, the following structure is employed:

More preferably, the aforementioned seat body has a seat portion, a backrest portion and a seat portion angle control device changing the angle formed by the aforementioned seat portion and the aforementioned backrest portion in response to change of the angle of backward inclination.

Thus, it is possible to eliminate pressure against the abdomen of the child. Consequently, the present child safety car seat has been made more comfortable.

A juvenile safety car seat according to still another aspect of the present invention, which is fixed to a seat of a car with a seat belt provided on the seat of the car, comprises an attachment angle control device for controlling the angle of attachment of the aforementioned juvenile safety car seat with respect to the aforementioned seat of the car.

Thus, it is possible to attach the present child safety car seat to the seat of the car at a proper attachment angle regardless of the shape of the seat of the car. Consequently, the present child safety car seat has been made more comfortable.

In order to implement the aforementioned aspect in a more preferable state, the following structure is employed:

More preferably, the aforementioned child safety car seat has a seat body supporting a child and a base supporting the aforementioned seat body, and the aforementioned attachment angle control device is provided on a bottom surface portion of the aforementioned base with a leg member projectable and stowable with respect to the aforementioned bottom surface portion in order to control inclination with respect to the aforementioned seat of the car.

A protector according to a further aspect of the present invention is employed for a child-care instrument having a support space for receiving a juvenile whose body is in the process of growth, and the aforementioned protector forms a receiving space for filling up a clearance defined between the aforementioned support space and the child while rendering the capacity of the aforementioned receiving space variable in response to the child's growth.

Thus, it is possible to protect the juvenile with a capacity responsive to growth of its body. Consequently, the child-care instrument employing this protector has been made more comfortable and safer for the entire body of the child.

In the aforementioned aspect, the protector preferably includes a head protector protecting the head of the child.

Thus, it is possible to protect the head of the child with a capacity responsive to the child's growth. Consequently, the child-care instrument employing the protector has been improved and made safer for the child's head.

In order to implement the aforementioned aspect in a more preferable state, the following structures are employed:

More preferably, the aforementioned head protector includes a pair of head side wall portions protecting the temporal regions of the child and a head side wall space control device for controlling the space between the pair of head side wall portions.

More preferably, the aforementioned head protector includes an inner head protector and an outer head protector arranged to doubly enclose the temporal regions and the parietal region of the child. Further preferably, the aforementioned inner head protector is so provided that the position of the inner head protector is vertically controllable with respect to the aforementioned outer head protector.

In the aforementioned aspect, the aforementioned protector preferably includes a shoulder protector protecting the shoulder region of the child.

Thus, it is possible to protect the shoulder region of the child with a capacity responsive to growth of the child. Consequently, the child-care instrument employing the protector has been improved to be more comfortable and safer for the shoulder region of the child.

In order to implement the aforementioned aspect in a more preferable state, the following structure is employed:

More preferably, the aforementioned shoulder protector includes a shoulder side wall portion protecting the lateral surfaces of the shoulder of the neonate or the infant and a shoulder side wall position control device for controlling the vertical position of the shoulder side wall portion.

In the aforementioned aspect, the aforementioned protector preferably includes an abdominal protector protecting the abdominal region of the child.

In order to implement the aforementioned aspect in a more preferable state, the following structure is employed:

More preferably, the aforementioned abdominal protector includes a crotch protector protecting the crotch region of the child.

In the aforementioned aspect, the aforementioned protector preferably includes a leg protector for protecting the child's legs with comfort and safety during the child's growth.

In the aforementioned aspect, the aforementioned protector preferably includes an upper protector protecting the head region and the shoulder region of the child, and a lower protector protecting the abdominal region and the leg region, and at least either the aforementioned upper protector or the aforementioned lower protector includes a length control device for controlling the length as the child grows taller.

Thus, it is possible to protect the child with a capacity responsive to growth. Consequently, the child-care instrument employing the protector has been made more comfortable and safer.

A protector for a child-care instrument according to a further aspect of the present invention, consisting of a flexible material, is arranged in a juvenile receiving space of the child-care instrument, and comprises an upper protector enclosing the upper half of the body of a juvenile, a lower protector enclosing the lower half of the child's body, and a head protector arranged inside the upper protector for enclosing the head of the child, whereby the head, particularly the brain, is well protected in a way comfortable for the growing child.

In order to implement the aforementioned aspect in a more preferable state, the following structures are employed:

More preferably, the protector further comprises a coupling device for detachably coupling the aforementioned upper protector and the aforementioned lower protector with each other.

More preferably, the protector further comprises a coupling device for detachably coupling the aforementioned head protector to the aforementioned upper protector.

A child-care instrument according to a further aspect of the present invention has a space supporting a baby, and the aforementioned space is provided to be capable of selecting a neonatal bed mode suitable as a habitat of a baby in a neonatal period, an infantile bed mode suitable to the habits of a baby in infancy, and a child seat mode suitable for the habits of a baby in childhood.

According to the aforementioned child-care instrument, it is possible to apply a bed mode or a seat mode most suitable for the baby on the basis of medical criteria for a baby in a neonatal period, infancy or childhood whose brain is in a developmental stage in particular, for protecting the brain, the neck and respiration of the baby in a proper state.

In the aforementioned aspect, the child-care instrument preferably has a protector for properly filling up a clearance defined between the aforementioned space and the baby by changing the mode in response to growth of the baby in a neonatal period or infancy in a state used in the aforementioned neonatal bed mode or the aforementioned infantile bed mode.

The aforementioned protector is integrally provided with a first head protector protecting the head of the baby from below, a second head protector protecting the head of the baby from the parietal side and the lateral surface sides, a first body protector supporting the body of the baby from below, and second body protectors, supporting the body of the baby from the lateral sides, provided in a pair on both sides of the first body protector.

More preferably, the child-care instrument is provided to be capable of coupling lower end portions of the second body protectors located on both sides and a lower end portion of the first body protector by bending the lower end portion of the first body protector upward.

Thus, when employing the protectors integrally provided to enclose the baby, it is possible to properly support the baby in response to its growth by displacing the position for supporting the baby.

More preferably, the child-care instrument further has a head pad for filling up a clearance between the first head protector and the head of the baby in order to protect the head of the baby.

Thus, it is possible to reliably protect the brain and the neck of the baby in a neonatal period, infancy or childhood whose brain is in a developmental stage.

More preferably, the aforementioned head pad has a sunshade for shielding the baby against exposure to light. Thus, it is possible to protect a baby in a neonatal period particularly sensitive to photic stimulation in a proper state.

More preferably, at least a region of the aforementioned head pad coming into contact with the baby is prepared from a material feeling approximate to the mother's breast. Thus, the baby can be put at ease.

More preferably, the child-care instrument further comprises a lumbar pad detachably provided inside the aforementioned second body protectors for covering the lumbar region of the baby. Thus, it is possible to protect the baby whose lumbar region is in a developmental stage in a proper state.

More preferably, at least a region of the aforementioned lumbar pad coming into contact with the baby is prepared from a material feeling approximate to the mother's breast. Thus, the baby can be put at ease.

More preferably, the child-care instrument further comprises a leg cover detachably provide on the protector for covering a portion close to the legs of the baby from above. Thus, it is possible to prevent the baby from chilling against cold air from an air conditioner, for example.

More preferably, at least a region of the aforementioned leg cover coming into contact with the baby is prepared from a material feeling approximate to the mother's breast. Thus, the baby can be put at ease.

More preferably, the child-care instrument further comprises a pair of body covers provided on both sides of the body of the baby for covering the body from above. Thus, the baby can be wrapped and put at ease. Further, it is possible to prevent the baby from chilling against cold air from an air conditioner, for example.

More preferably, the child-care instrument further has a fixing device for opening the aforementioned pair of body covers outward and temporarily fixing the pair of body covers in the open states. Thus, when employing this child-care instrument as a juvenile safety car seat, it is possible to hold a safety belt provided on the juvenile safety car seat on both sides with the body covers, whereby the baby can be smoothly put on/out of the juvenile safety car seat with no hindrance by the safety belt.

More preferably, at least regions of the aforementioned pair of body covers coming into contact with the baby are prepared from a material feeding approximate to the mother's breast. Thus, the baby can be put at ease.

More preferably, at least a region of the aforementioned protector coming into contact with the baby is prepared from a material feeling approximate to the mother's breast. Thus, the baby can be put at ease.

A bed for a neonate according to a further aspect of the present invention, having a support space suitable to the habitus of a baby in a neonatal period, has a protector for properly filling up a clearance defined between the aforementioned support space and the baby.

According to the aforementioned bed for a newborn, it is possible to apply a bed mode most suitable for a baby in a neonatal period on the basis of medical criteria for a baby in a neonatal period whose brain is in a developmental stage in particular, for protecting the brain, the neck and respiration of the newborn baby.

Preferably, the aforementioned bed for a neonate further has a head pad for filling up a clearance between the bed and the head of the baby in order to protect the head of the baby in a neonatal period.

Thus, it is possible to protect the head of the baby in a neonatal period by a double structure of at least the protector and the head pad, and the brain and the neck of the baby in a neonatal period whose brain is in a developmental stage can be protected in a proper state.

More preferably, the aforementioned head pad has a sunshade for shielding the baby against exposure to light. Thus, it is possible to protect the baby in a neonatal period particularly sensitive to photic stimulation in a proper state.

More preferably, at least a region of the aforementioned head pad coming into contact with the baby is prepared from a material feeling approximate to the mother's breast. Thus, the baby can be put at ease.

More preferably, the bed for a neonate has a sunshade for shielding the baby against exposure to light. Thus, it is possible to protect the baby in a neonatal period particularly sensitive to photic stimulation in a proper state.

More preferably, at least a region of the aforementioned protector coming into contact with the baby is prepared from a material feeling approximate to the mother's breast. Thus, the baby can be put at ease.

More preferably, the bed for a neonate further comprises a lumbar pad for filling up a clearance between the aforementioned bed for a neonate and the lumbar region of the baby. Thus, it is possible to protect the baby whose lumbar region is in a developmental stage in a proper state.

More preferably, at least a region of the aforementioned lumbar pad coming into contact with the baby is prepared from a material feeling approximate to the mother's breast. Thus, the baby can be put at ease.

More preferably, the bed for a neonate further comprises a leg cover for covering a portion close to the legs of the baby from above. Thus, it is possible to protect the baby against a cold air chilling effect from an air conditioner, for example.

More preferably, at least a region of the aforementioned leg cover coming into contact with the baby is prepared from a material feeling approximate to the mother's breast. Thus, the baby can be put at ease.

More preferably, the bed for a neonate further comprises a pair of body covers provided on both sides of the body of the baby for covering the body from above. Thus, the baby can be wrapped and put at ease. Further, it is possible to protect the baby against a cold air chilling effect from an air conditioner, for example.

More preferably, at least regions of the aforementioned pair of body covers coming into contact with the baby are prepared from a material feeling approximate to the mother's breast. Thus, the baby can be put at ease.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
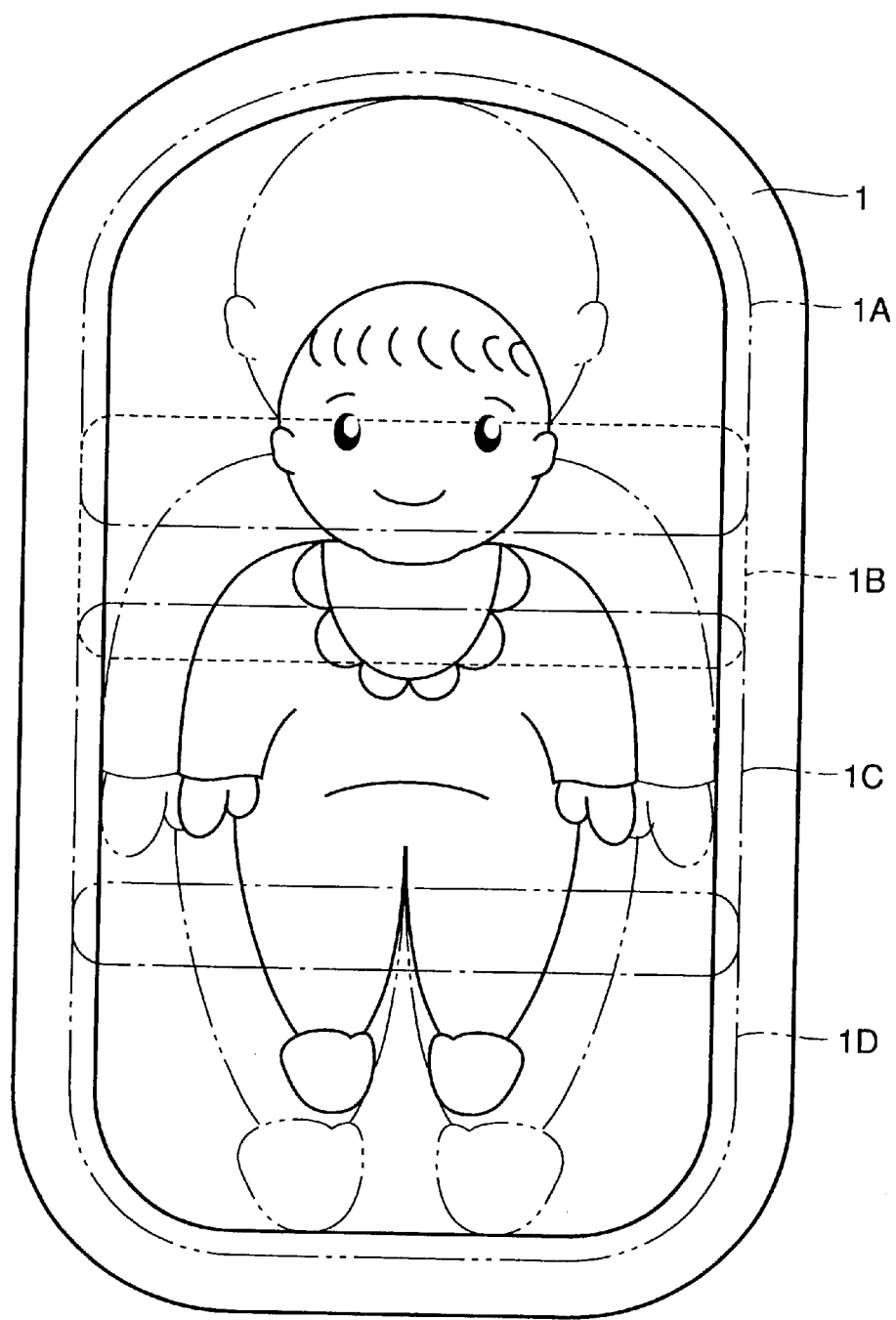
FIG. 1 is a model diagram showing the concept of a support space of a juvenile or child safety car seat.

As shown in FIG. 1, a newborn baby grows into an infant, a child and a schoolchild, and its habits change. For example, the shape of the head, the breadth of the shoulders, the lumbar size, the length of the legs and the like grow. Therefore, a child safety car seat must totally change the capacity of a support space for receiving a growing child. Thus, it is possible to regularly provide an optimum space responsive to the habits of the child for improving safeness.

The internal space of a juvenile safety car seat 1 can be classified into a head space 1A, a shoulder space 1B, an abdominal space 1C and a leg space 1D in response to the portions of the body of the juvenile. Therefore, it is possible to totally change the capacity of the support space by implementing a structure rendering the capacity of each space variable.

The structure of a juvenile safety car seat according to each embodiment of the present invention employing means for changing the capacity of each space is now described with reference to the drawings.

First Embodiment

This embodiment is described with reference to a juvenile safety car seat 1000 having means capable of changing the capacity of a support space in the juvenile car seat 1000 itself.

Figure 2:
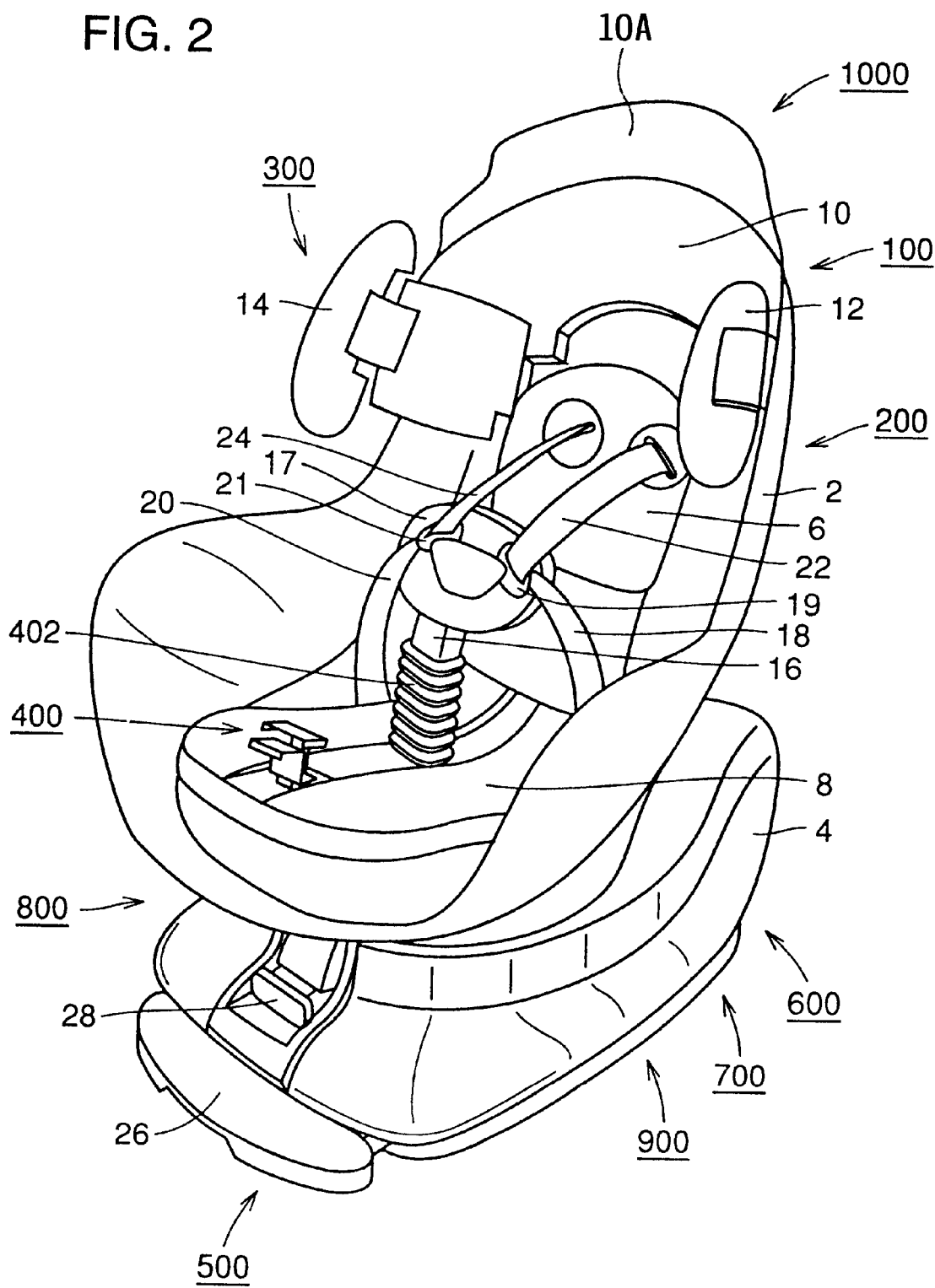
FIG. 2 is a total perspective view showing the structure of a juvenile safety car seat according to a first embodiment of the present invention.

The structure of the juvenile safety car seat 1000 according to this embodiment is now described with reference to FIG. 2. FIG. 2 omits illustration of a cushion member essentially required for the juvenile safety car seat 1000, in order to clarify the structure of the juvenile safety car seat 1000. A crotch belt 16 is covered with a cushion member 402 including a bellows member, to be self-sustainable.

The juvenile safety car seat 1000 has a seat body 2 and a base 4 supporting the seat body 2 to be rotatable and backwardly inclinable. The seat body 2 includes a backrest portion 6, a seat portion 8 and a headrest 10.

Figure 3:
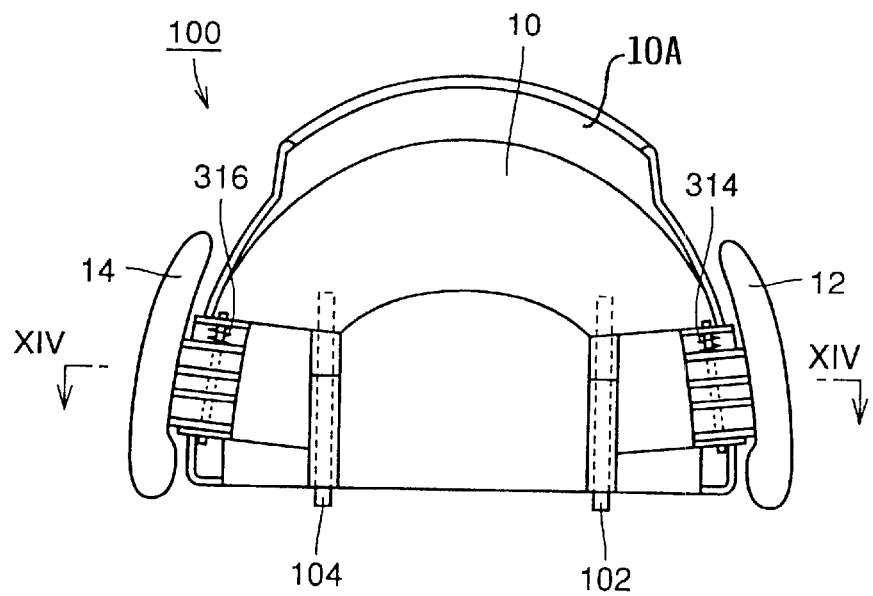
FIGS. 3 to 8 are first to sixth diagrams showing the structure of a headrest vertical mover 100.
Figure 4:
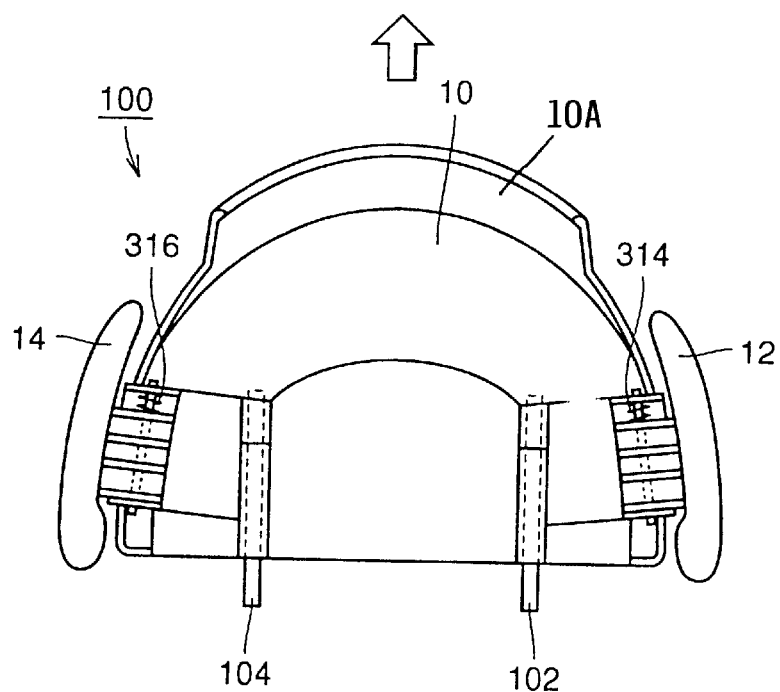

The seat body 2 has a dome shape for serving both sides as side guards and armrests, and the headrest 10 has a dome shape for serving both as a head guard and side guards. A pair of sleeping supports 12 and 14 are attached to the headrest 10. The headrest 10 has a guard wall 10A rising from a plane of the headrest 10 at such an angle that the top of the head of a child in the seat is at least partly covered, as seen in FIGS. 2, 3 and 4.

A five-point safety belt for fixing a juvenile to the juvenile safety car seat 1000 is provided on the backrest portion 6 and the seat portion 8. This five-point safety belt has the crotch belt 16, located on the crotch of the juvenile, having a buckle 17 on its upper portion, lumbar belts 18 and 20, tongue plates 19 and 21 and shoulder belts 22 and 24.

The base 4 is provided with a footrest step 26 serving as a footrest and a control lever 28 for controlling rotation and backward inclination of the seat body 2, i.e., locking the seat body 2 on a rotational position and a backwardly inclining position and releasing the same from the locked states.

The juvenile safety car seat 1000 having the aforementioned structure is provided with a headrest vertical mover 100, a shoulder belt position controller 200, a sleeping support position controller 300, a crotch belt position controller 400, a footrest step position controller 500 and a mover 800, in order to change the capacity of a support space.

The headrest vertical mover 100 and the sleeping support position controller 300 form head space control means, the shoulder belt position controller 200 forms shoulder space control means, the crotch belt position controller 400 forms abdominal space control means, and the footrest step position controller 500 forms leg space control means. The mover 800 forms seat portion angle control means.

The juvenile safety car seat 1000 is further provided with a rotator 600 and a backward incliner 700 in order to improve handleability, and provided with a stand 900 in order to improve attachability.

The headrest vertical mover 100, the shoulder belt position controller 200, the sleeping support position controller 300, the crotch belt position controller 400, the footrest step position controller 500, the rotator 600, the backward incliner 700, the mover 800 and the stand 900 are now described with reference to the drawings.

Headrest Vertical Mover 100

The structure of the headrest vertical mover 100 is described with reference to FIGS. 3 and 4. The headrest 10 is provided to be vertically slidable along headrest guide bars 102 and 104 provided on the seat body 2. The headrest 10 is located most downward in FIG. 3 and most upward in FIG. 4 respectively.

Figure 5:
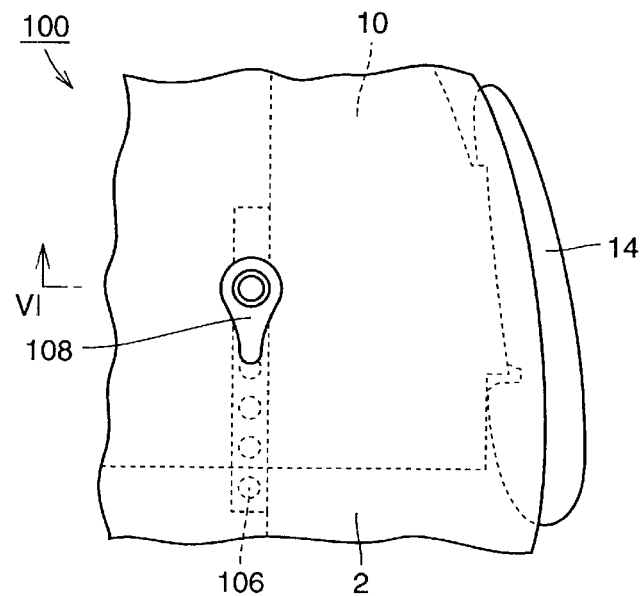
Figure 7:
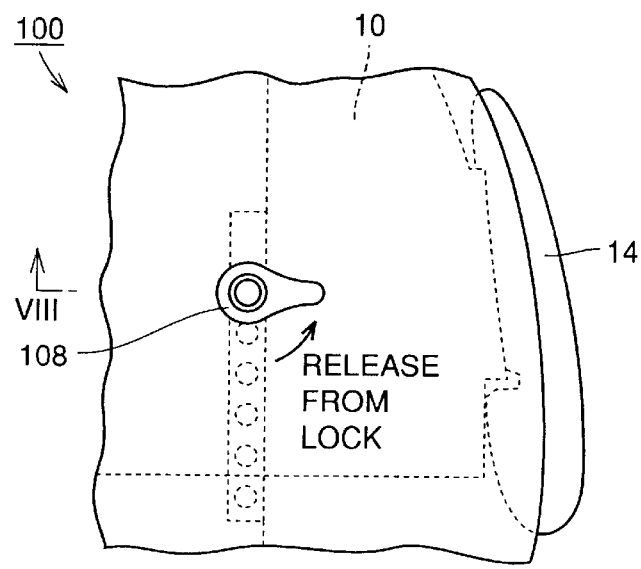
Figure 8:
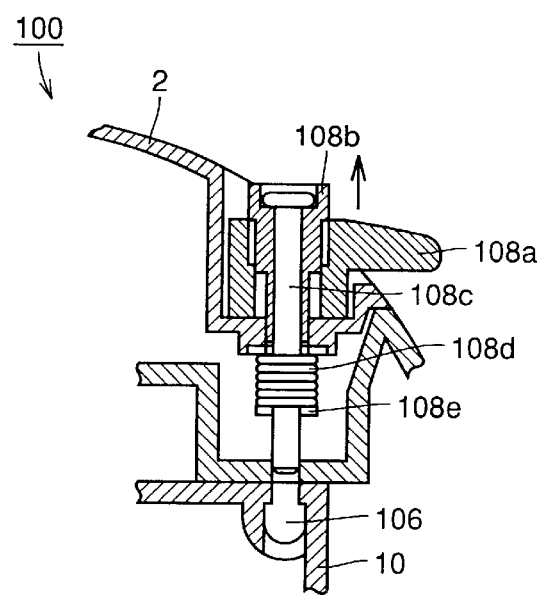

Means for fixing the headrest 10 to the seat body 2 is now described with reference to FIGS. 5 to 8. FIG. 5 shows the headrest 10 fixed to the seat body 2, FIG. 6 is a sectional view taken along the line VI in FIG. 5, FIG. 7 shows the headrest 10 released from fixation to the seat body 2, and FIG. 8 is a sectional view taken along the line VIII in FIG. 7.

The headrest 10 is provided with a plurality of locking holes 106 along the direction of movement thereof, and the seat body 2 is provided with a locking lever 108 having a locking pin 108c inserted in any of the locking holes 106.

The locking lever 108 has a lever body 108a, a block 108b inserted in the lever body 108a, the locking pin 108c supported by the block 108b, a coil spring 108d for supplying elastic force to the locking lever 108, and a plate 108e, supporting the coil spring 108d, fixed to the locking pin 108c.

Figure 6:
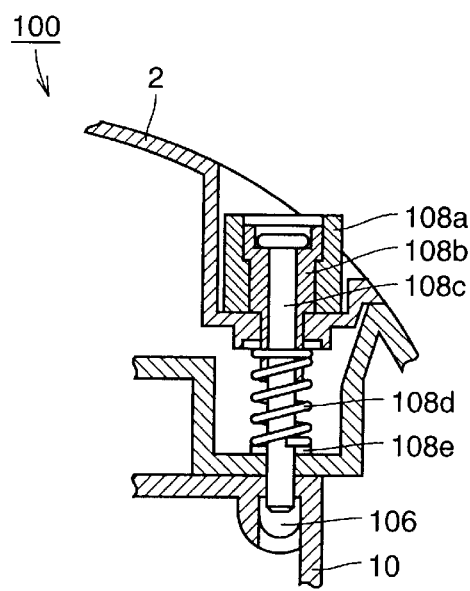

In a locked state, the locking pin 108c is inserted in any locking hole 106 due to the elastic force of the coil spring 108d, as shown in FIGS. 5 and 6. In a state released from locking, the locking lever 108 is rotated anticlockwise for pulling up the locking pin 108c due to action of spiral engaging irregularities (not shown) provided on the inner peripheral surface of the lever body 108a and the outer peripheral surface of the block 108b.

Thus, it is possible to protect the head region of the juvenile with a capacity responsive to growth of the juvenile by rendering the headrest 10 vertically movable with respect to the seat body 2. Consequently, the juvenile safety car seat 1000 can be improved in comfortability and safeness for the head region of the juvenile.

While the headrest 10 serves both as a head guard and side guards in this embodiment, the headrest vertical mover 100 is also applicable to a head guard and side guards having individual structures respectively.

Belt Position Controller 200

Figure 9:
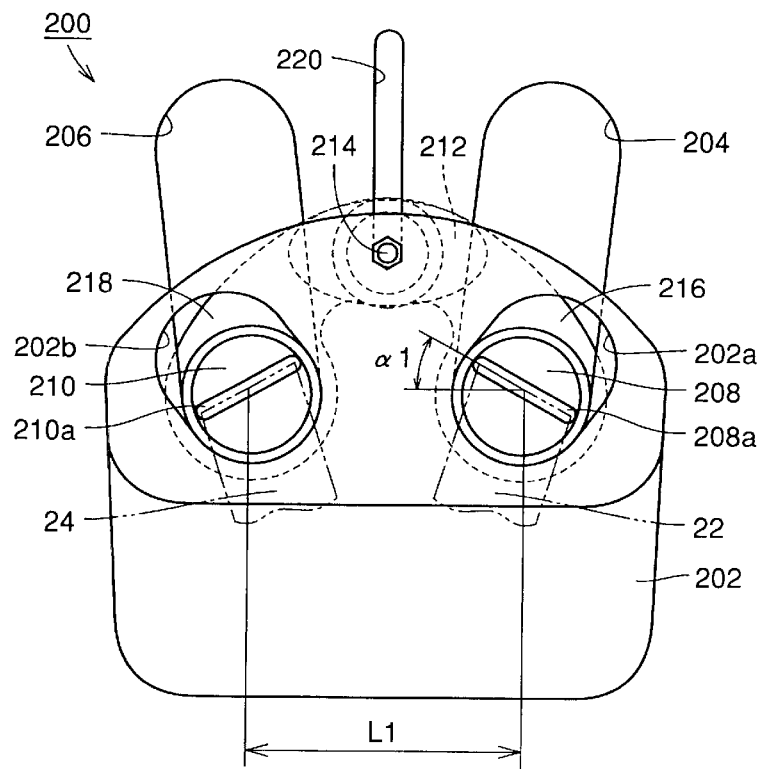
FIGS. 9 to 13 are first to fifth diagrams showing the structure of a shoulder belt position controller 200.
Figure 10:
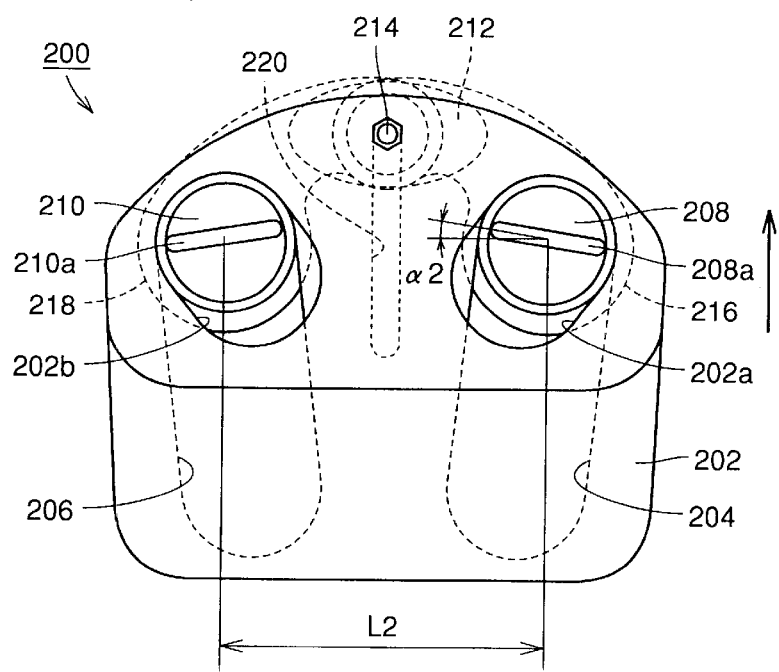

The structure of the shoulder belt position controller 200 is described with reference to FIGS. 9 to 13. Referring to FIG. 9, circular holding plates 208 and 210 having slits 208a and 210a for receiving the shoulder belts 22 and 24 are rotatably attached to shoulder belt control arms 216 and 218 respectively in the shoulder belt position controller 200. The shoulder belt control arms 216 and 218 are supported by a shoulder belt control pin 214 to be rotatable about the shoulder belt control pin 214.

The shoulder belt control pin 214 is vertically slidable along a shoulder belt control guide hole 220 provided on the seat body 2. The holding plates 208 and 210 are attached to the shoulder belt control arms 216 and 218, and also movable along elongated sliding holes 204 and 206 provided on the seat body 2.

Further, a vertical moving plate 202 is arranged on the front side of the seat body 2, and guide holes 202a and 202b provided on the vertical moving plate 202 hold the holding plates 208 and 210. The front end of the shoulder belt control pin 214 is fixed to the vertical moving plate 202.

Therefore, the vertical moving plate 202 vertically moves in response to vertical movement of the shoulder belt control pin 214, so that the holding plates 208 and 210 vertically move along the sliding holes 204 and 206. The holding plates 208 and 210 are located most downward in FIG. 9 and most upward in FIG. 10 respectively.

The holding plates 208 and 210 are at a space L1 and the slits 208a and 210a are at an angle α1 when the holding plates 208 and 210 are located most downward, while the holding plates 208 and 210 are at a space L2 larger than the space L1 and the slits 208a and 210a are at an angle α2 smaller than the angle α1 when the holding plates 208 and 210 are located most upward.

Figure 11:
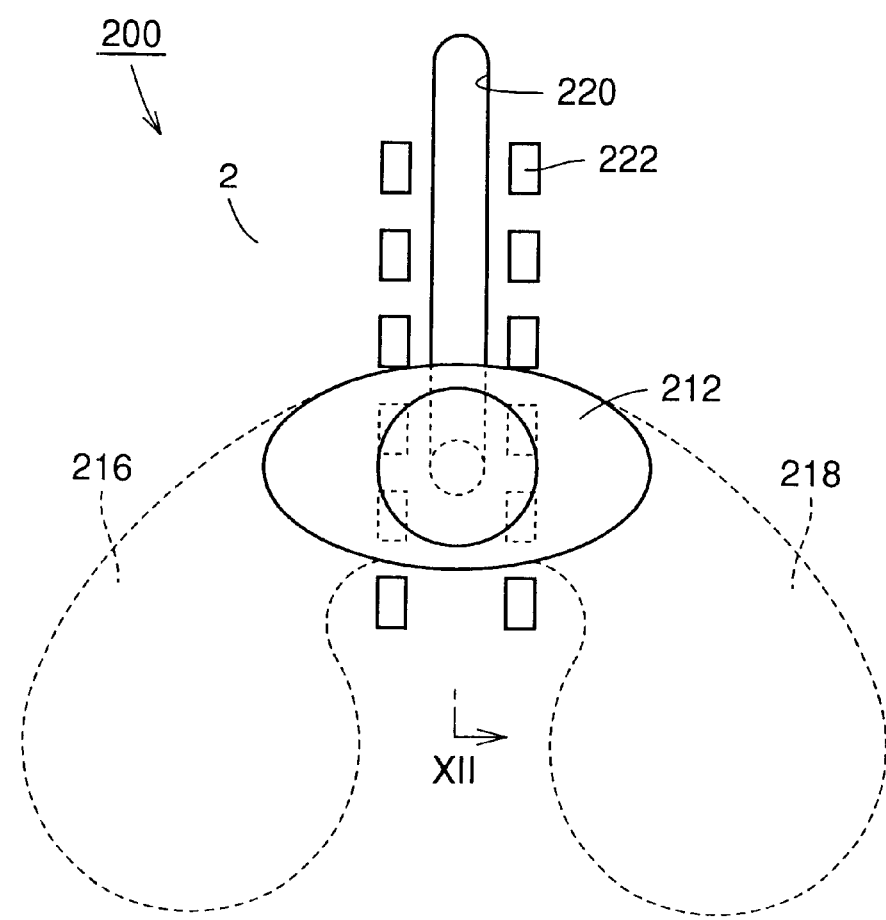
Figure 12:
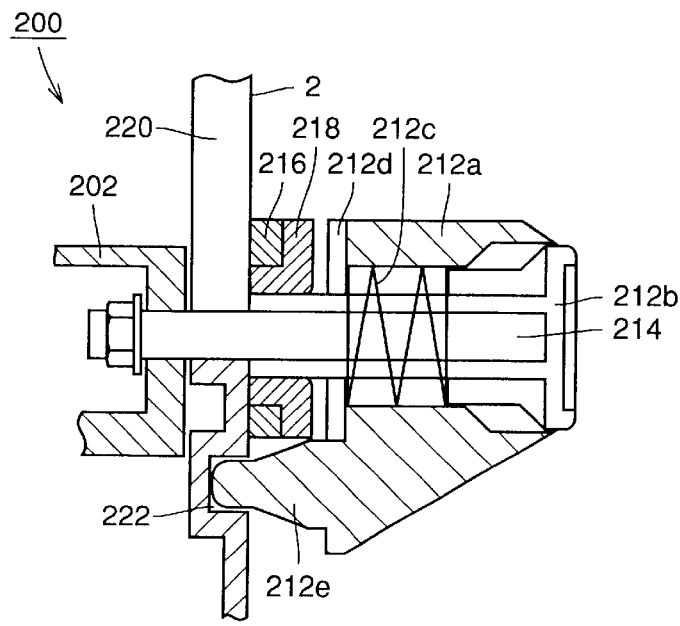
Figure 13:
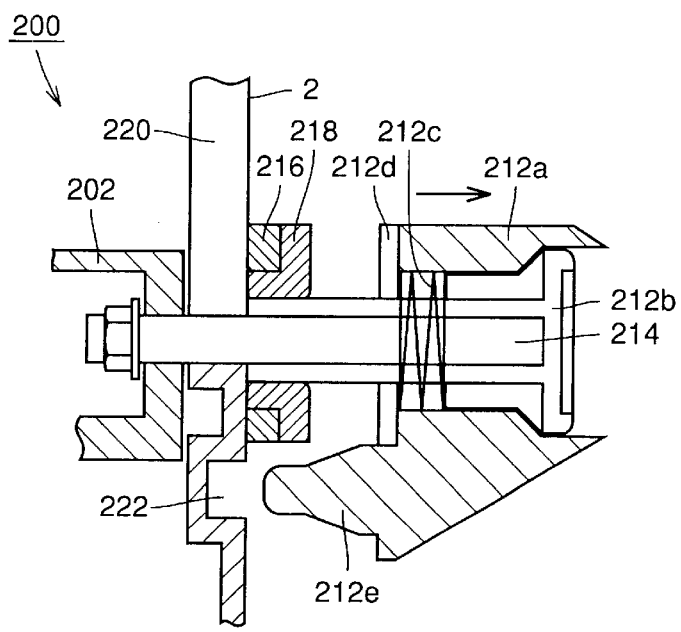

Position fixing means for the holding plates 208 and 210 is now described with reference to FIGS. 11 to 13. FIG. 11 is a rear elevational view of the seat body 2, and FIG. 12 is a sectional view taken along the line XII in FIG. 11 showing the holding plates 208 and 210 at fixed positions. FIG. 13 is a sectional view taken along the line XII in FIG. 11 showing the holding plates 208 and 210 released from positional fixation.

As shown in FIG. 11, the shoulder belt control pin 214 is provided on its rear end with a shoulder belt control lever 212 for controlling the vertical positions of the holding plates 208 and 210, and the seat body 2 is provided with shoulder belt control locking holes 222 along the direction of movement thereof.

As shown in FIG. 12 in detail, the shoulder belt control lever 212 has a lever body 212a and a release button 212b stored in the lever body 212a, and the shoulder belt control pin 214 is fixed to the release button 212b.

A coil spring 212c is provided in the lever body 212a, so that elastic force can be supplied to the release button 212b with a plate 212d. A locking pin 212e is mounted on the outer surface of the lever body 212a, to be inserted into any shoulder belt control locking pin 222.

In a locked state, the elastic force of the coil spring 212c acts in a direction for inserting the locking pin 212e mounted on the lever body 212a into any shoulder belt control locking hole 222, as shown in FIG. 12.

In a state released from locking, the lever body 212a is pulled up against the elastic force of the coil spring 212c, thereby pulling up the locking pin 212e from the shoulder belt control locking hole 222, as shown in FIG. 13.

Thus, it is possible to protect the shoulder region of the juvenile with a capacity responsive to growth of the juvenile by rendering the vertical positions of and the space between the holding plates 208 and 210 and the angle of the slits 208a and 210a controllable.

While the vertical positions of and the space between the holding plates 208 and 210 and the angle of the slits 208a and 210a can be controlled by a single device in this embodiment, structures having these functions independently of each other can also be employed.

Sleeping Support Position Controller 300

Figure 14:
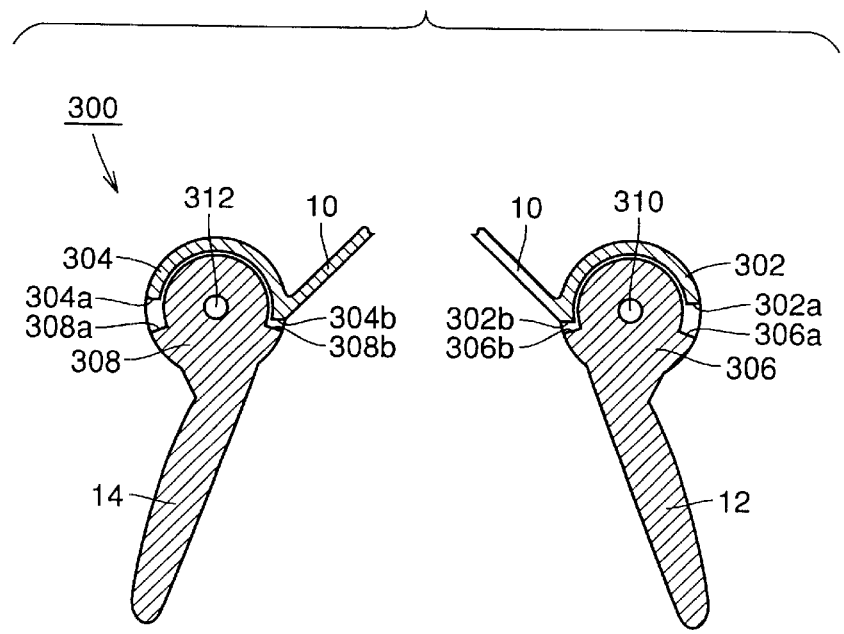
FIGS. 14 to 17 are first to fourth diagrams showing the structure of a sleeping support position controller 300.

The structure of the sleeping support position controller 300 is described with reference to FIGS. 14 to 17. Referring to FIG. 14, the sleeping support position controller 300 has bearings 302 and 304 provided on the headrest 10 and shafts 306 and 308 provided on the sleeping supports 12 and 14.

The bearings 302 and 304 have substantially cylindrical shapes with front open portions, and are provided with stoppers 302a, 302b, 304a and 304b for limiting rotation of the sleeping supports 12 and 14.

The shafts 306 and 308 also have substantially cylindrical shapes with open portions receivable in the bearings 302 and 304, and are provided with stoppers 306a, 306b, 308a and 308b for coming into contact with the bearings 302 and 304.

The shafts 306 and 308 are supported by pins 310 and 312 to be rotatable with respect to the bearings 302 and 304, and supported by elastic force of coil springs 314 and 316 (see FIG. 3) inserted from above the pins 310 and 312.

Figure 15:
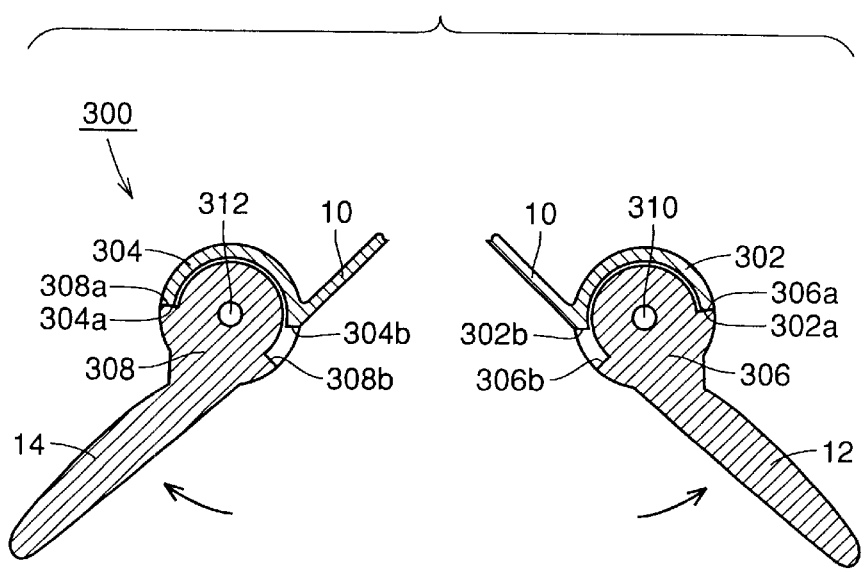

The space between the sleeping supports 12 and 14 is narrow in FIG. 14 and widest in FIG. 15. FIGS. 14 and 15 are sectional views taken along the line XIV—XIV in FIG. 3.

Figure 16:
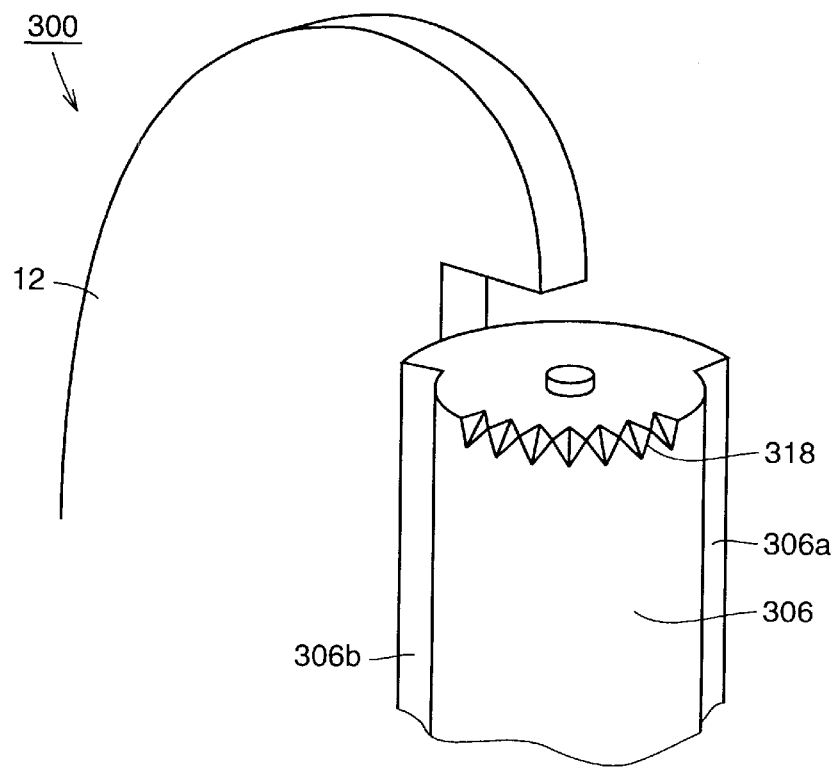
Figure 17:
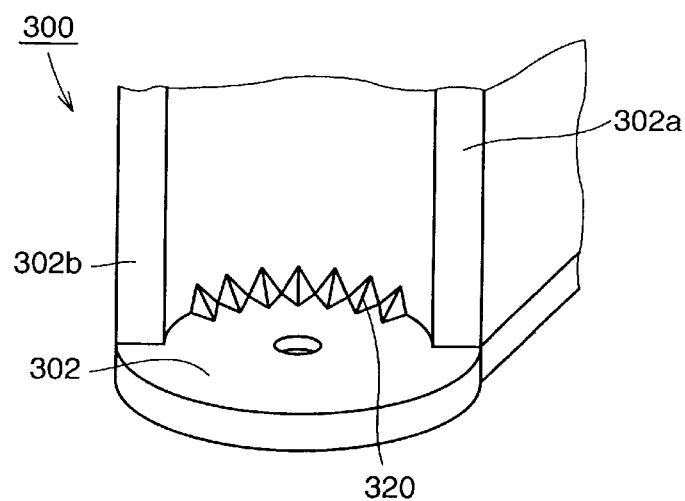

Concave portions 318 provided on the lower surfaces of the shafts 306 and 308 engage with convex portions 320 provided on the lower surfaces of the bearings 302 and 304 as shown in FIGS. 16 and 17 and the coil springs 314 and 316 inserted from above maintain this engaging state with elastic force, thereby fixing the positions of the sleeping supports 12 and 14.

FIG. 16 illustrates the shaft 306 and the sleeping support 12 in an inverted manner, in order to clearly illustrate the shapes of the concave portions 318 provided on the lower surfaces of the shafts 306 and 308.

Thus, it is possible to protect the head region of the juvenile with a capacity responsive to growth of the juvenile by rendering the space between the sleeping supports 12 and 14 controllable.

In this embodiment, the sleeping supports 12 and 14 are fixed to the headrest 10 and hence a function/effect similar to that in the case of vertically moving the headrest 10 can be attained by vertically moving the headrest 10. Alternatively, a structure independent of the headrest 10 can be employed.

While the headrest 10 also serves as side guards and hence the side guards are fixed in this embodiment, the function of side guards may be separately added for applying the function of controlling the space between the sleeping supports 12 to the side guards.

Belt Position Controller 400

Figure 18:
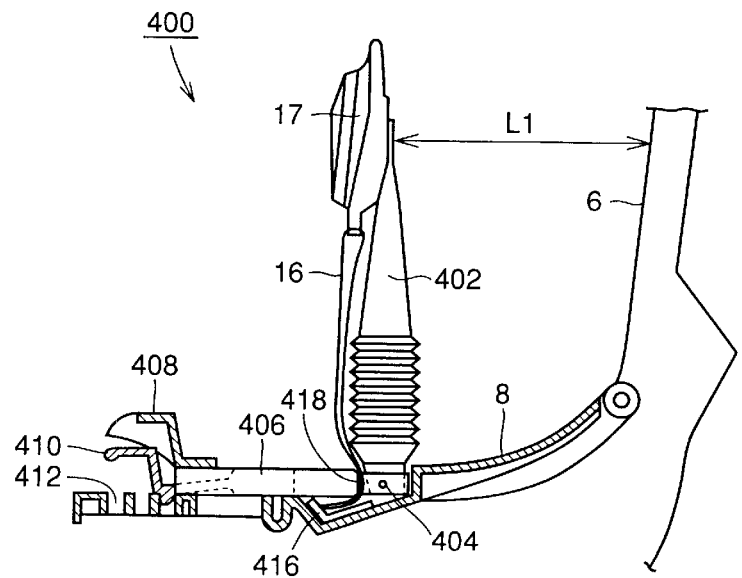
FIGS. 18 to 20 are first to third diagrams showing the structure of a crotch belt position controller 400.

The structure of the crotch belt position controller 400 is described with reference to FIGS. 18 to 20. Referring to FIG. 18, a fixing plate 416 to which the crotch belt 16 is fixed is mounted on the seat portion 8 provided on the seat body 2 in the crotch belt position controller 400. The lower ends of the buckle 17 and the cushion member 402 including the bellows member for rendering the crotch belt 16 self-sustainable are fixed to a crotch belt position control plate 406 with fixing pins 404.

A crotch belt position control lever 408 for controlling the horizontal position of the crotch belt position control plate 406 and a crotch belt position control locking lever 410 consisting an elastic member are provided on the front side of the crotch belt position control plate 406. The seat portion 8 provided on the seat body 2 has crotch belt position control locking holes 412 along the horizontal direction. The lower end of the crotch belt 16 is fixed to the fixing plate 416 through an opening 418 provided on the crotch belt position control lever 408.

Figure 19:
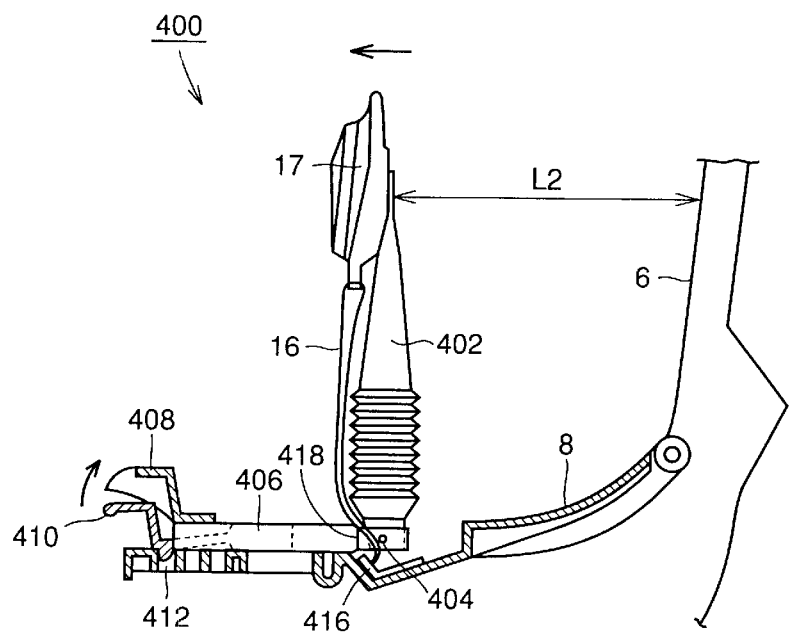

The buckle 17 is arranged in a position at a distance L1 closest to the backrest portion 6 of the seat body 2 in FIG. 18, and arranged in a position at a distance L2>L1 farthest from the backrest portion 6 of the seat body 2 in FIG. 19.

Figure 20:
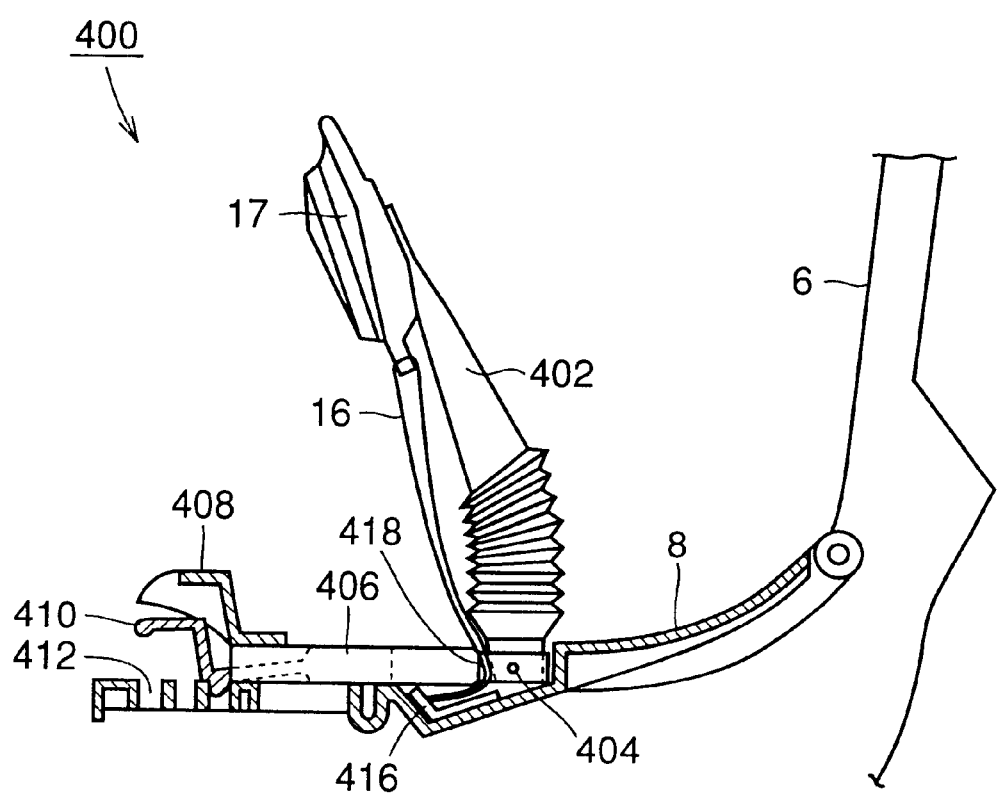

As shown in FIG. 20, the buckle 17 can be reduced in height with respect to the seat portion 8 and can incline frontward when the same is closest to the backrest portion 6 by selecting the length of the crotch belt 16.

Thus, it is possible to protect the abdominal region of the juvenile with a capacity responsive to growth of the juvenile by rendering the horizontal position of the crotch belt 16 having the buckle 17 controllable. Consequently, the juvenile safety car seat 1000 can be improved in comfortability and safeness for the abdominal region of the juvenile.

Footrest Step Position Controller 500

Figure 21:
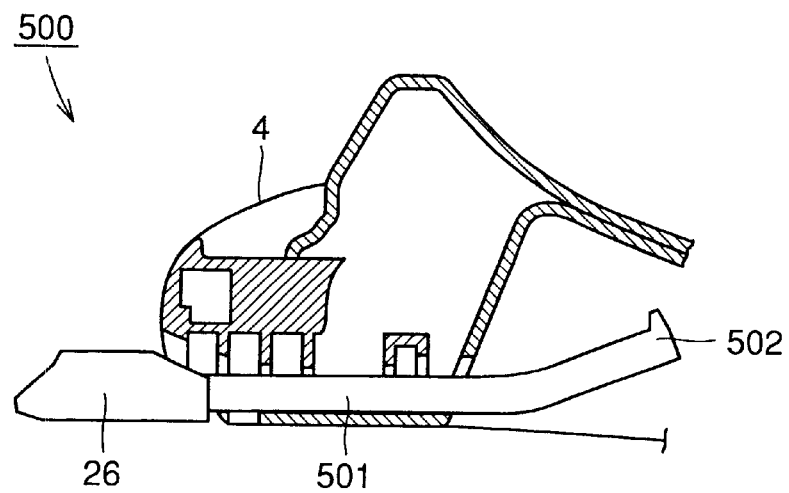
FIGS. 21 and 22 are first and second diagrams showing the structure of a footrest step position controller 500.

The structure of the footrest step position controller 500 is described with reference to FIGS. 21 and 22. Referring to FIG. 21, the footrest step 26 is provided with a guide bar 501 for rendering the footrest step 26 frontwardly slidable, and a stopper 502 is provided on the rear end of the guide bar 501.

Figure 22:
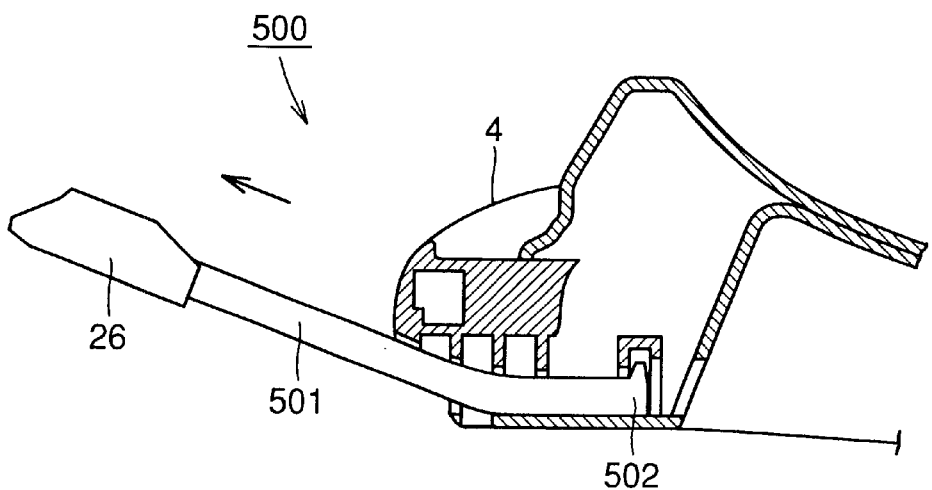

The footrest step 26 is located closest to the base 4 in FIG. 21, and most drawn out from the base 4 in FIG. 22.

Thus, it is possible to protect the leg region of the juvenile with a capacity responsive to growth of the juvenile by rendering the footrest step 26 drawable from the base 4.

Rotator 600, Backward Incliner 700 and Mover 800

Figure 23:
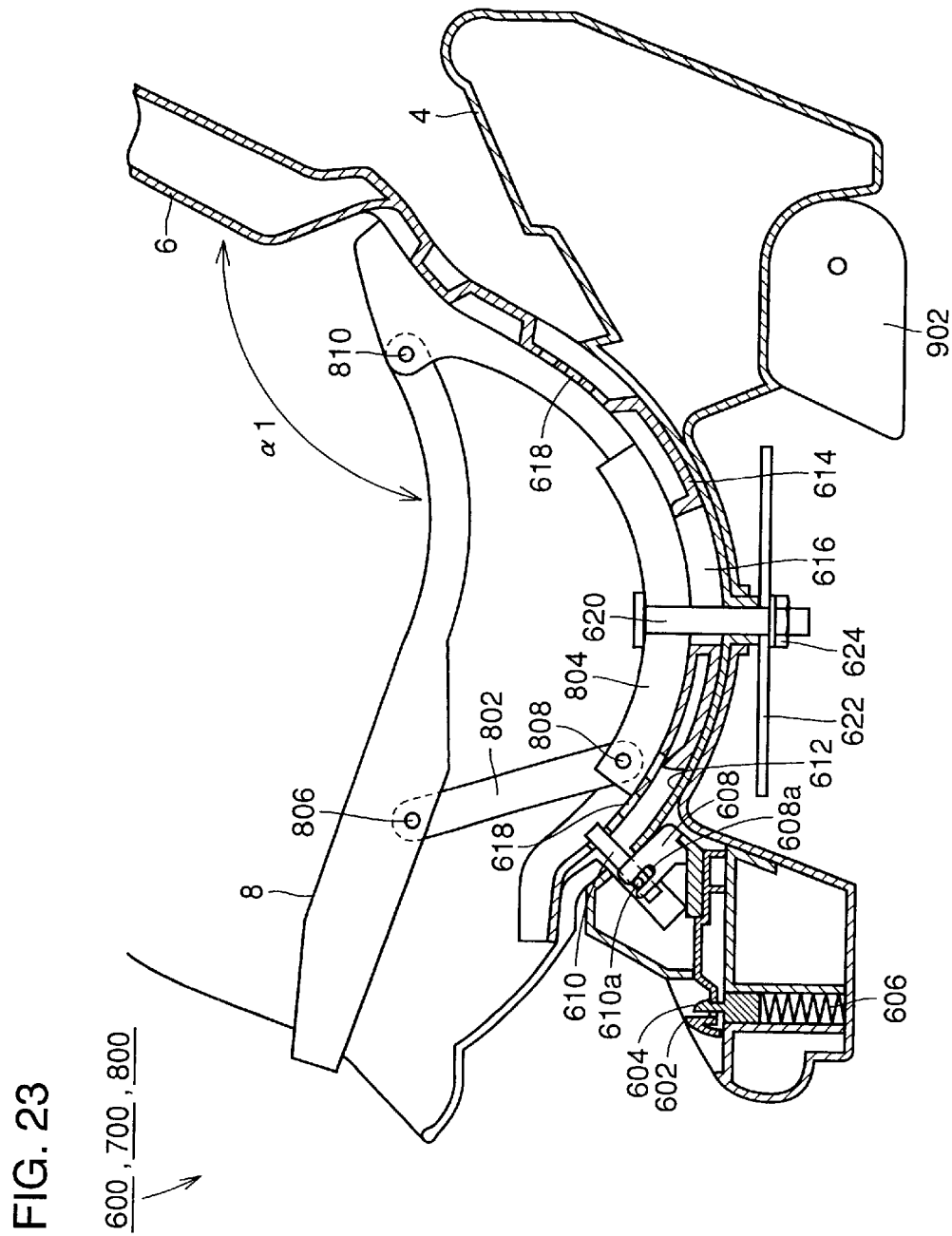
FIGS. 23 to 26 are first to fourth diagrams showing the structures of a rotator 600, a backward incliner 700 and a mover 800.

The structures of the rotator 600 and the backward incliner 700 are first described with reference to FIGS. 23 and 24. The rotator 600 has a locking and locking release mechanism including a control lever 602 arranged on the front side of the base 4, a locking button 604 for controlling a locked state of the control lever 602, a coil spring 606 for supplying vertical elastic force to the locking button 604, a locking plate 608, coupled to the rear end of the control lever 602, having a slit 608a, a locking pin 610 having a concave portion 610a guided into the slit 608a, and a plurality of locking holes 618 provided on the front and rear portions of the seat body 2 for receiving the locking pin 610 thereby limiting positions of rotation and backward inclination of the seat body 2 with respect to the base 4.

The base 4 is provided with a spherical concave region 612 limiting positions of rotation and backward inclination with respect to the seat body 2, so that a spherical convex region 614 provided on the seat body 2 engages with the concave region 612 and the seat body 2 rotates with respect to the base 4 about a rotation pin 620. The seat body 2 inclines with respect to the base 4 within the range of a guide hole 616 provided on the seat body 2.

The locking holes 618 are provided on a meridian horizontally extending through the rotation pin 620 of the spherical convex region 614. The locking pin 610 is arranged on a position of the spherical concave region 612 corresponding to the aforementioned meridian.

Figure 24:
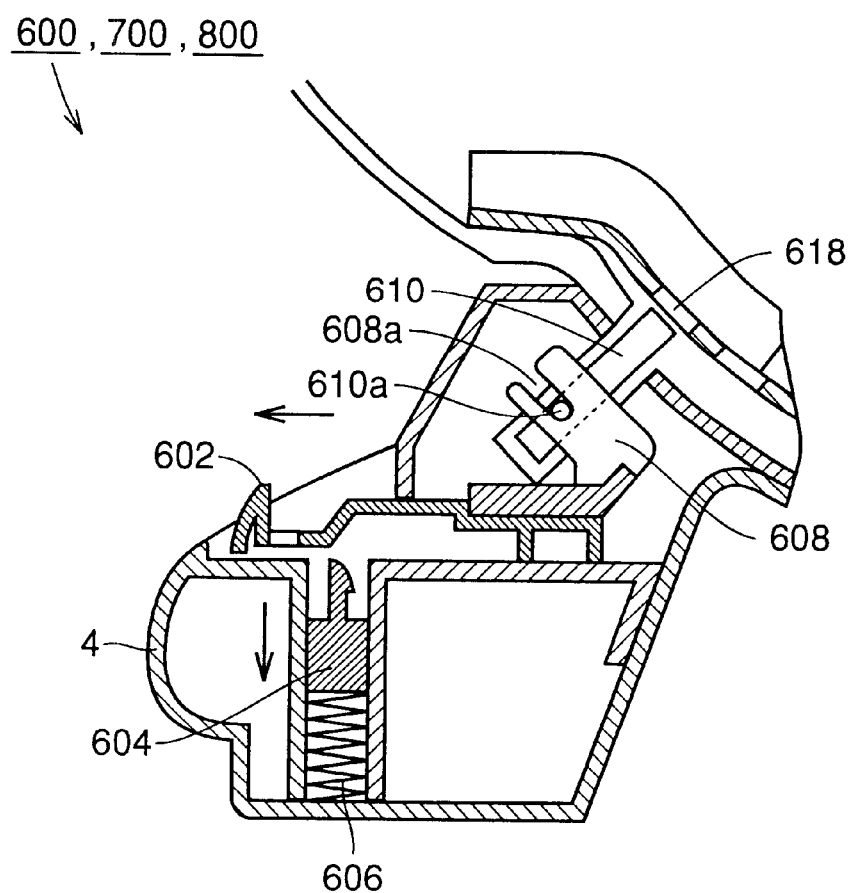

In order to release the seat body 2 from the positions of rotation and backward inclination with respect to the base 4 by the aforementioned locking and locking release mechanism, the control lever 602 is drawn out frontward while pressing the locking button 604 downward as shown in FIG. 24, so that the locking pin 610 obliquely moves downward. Thus, the locking pin 610 is disengaged from any locking hole 618.

Thus, the spherical convex region 614 provided on the seat body 2 engages with the concave region 612 provided on the base 4 while the locking pin 610 and the locking holes 618 are arranged on positions corresponding to the common meridian, thereby enabling implementation of the rotator 600 and the backward incliner 700 on the basis of a single locking mechanism. The seat body 2 is most upright with respect to the base 4 in FIG. 23, most inclined with respect to the base 4 in FIG. 25, and rotated by 180° with respect to the base 4 in FIG. 26.

The structure of the mover 800 is now described with reference to FIG. 23. The mover 800 has a support plate 804 provided on the seat body 2 and a coupling plate 802 coupling the support plate 804 with the seat portion 8.

The coupling plate 802 is rotatably coupled with the seat portion 8 on the one end with a pin 806, and rotatably coupled with the support plate 804 on another end with a pin 808. The seat portion 8 is coupled to the support plate 804 on its rear end with a rotary shaft 810.

Figure 25:
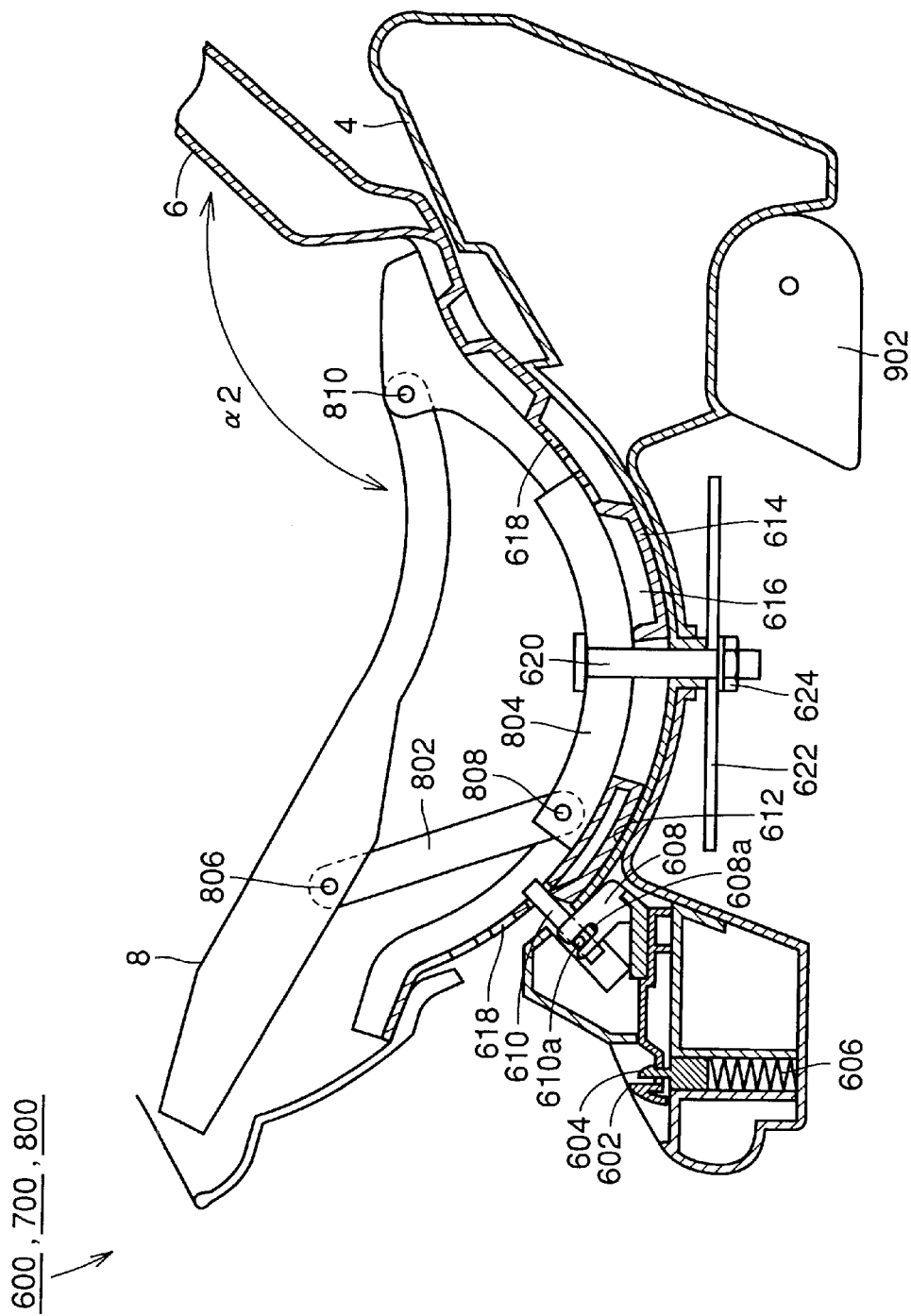
Figure 26:
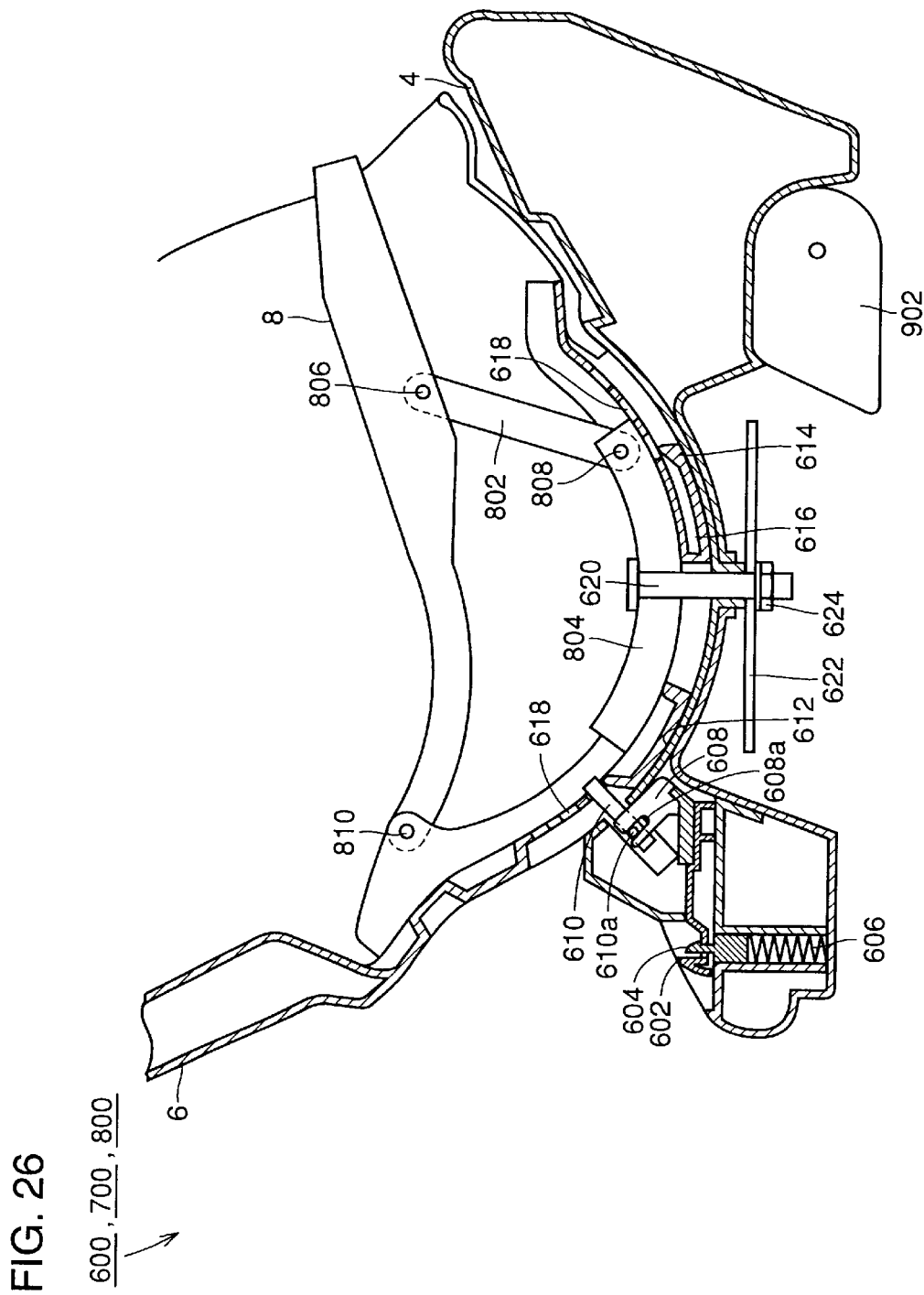

The mover 800 can be implemented by the aforementioned structure. When the seat body 2 is most upright with respect to the base 4, the backrest portion 6 and the seat portion 8 form an angle $\alpha1$ as shown in FIG. 23. When the seat body 2 is most inclined with respect to the base 4, the backrest portion 6 and the seat portion 8 form an angle $\alpha2$ larger than the angle $\alpha1$, as shown in FIG. 25.

Thus, the single control lever 602 controls operations of the rotator 600 and the backward incliner 700 and this control lever 602 is provided on the base 4, so that the position of the juvenile safety car seat 1000 remains unchanged after the same is attached to the seat of the car. Further, it is possible to eliminate pressure against the abdomen of the juvenile with the mover 800.

Stand 900

Figure 27:
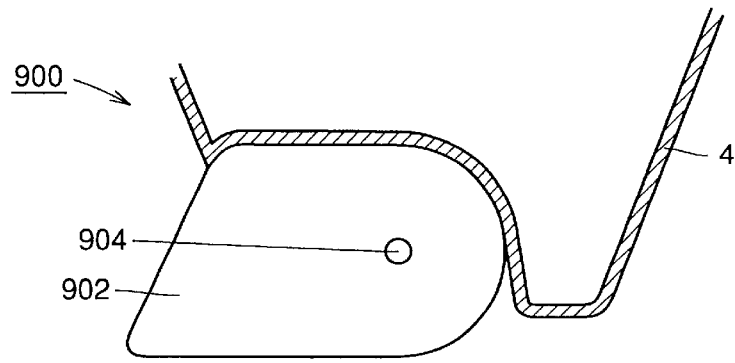
FIGS. 27 to 29 are first to third diagrams showing the structure of a stand 900.
Figure 28:
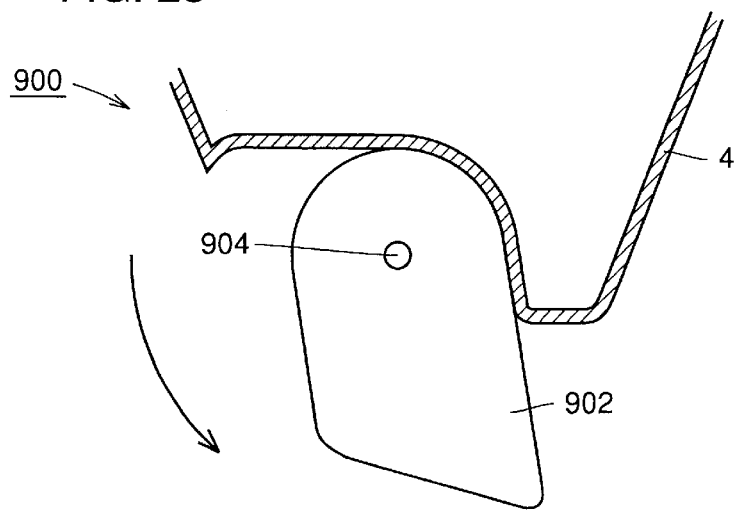

The structure of the stand 900 is described with reference to FIGS. 27 and 28. The stand 900 forms attachment angle control means for controlling the angle of attachment of the juvenile safety car seat 1000.

A fitting stand 902 is provided on the rear side of the bottom surface of the base 4 as a leg member projectable and stowable with respect to the bottom surface, in order to control inclination with respect to the seat of the car. The fitting stand 902 is projectable and stowable about a rotation axis 904. The fitting stand 902 is stowed in FIG. 27 and projects in FIG. 28.

Figure 29:
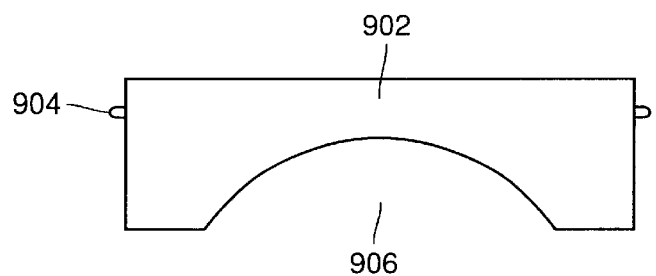

As shown in FIG. 29, the fitting stand 902 has a concave shape 906 with a concave center. Thus, it is possible to attach the juvenile safety car seat 1000 to the seat of the car at a proper angle regardless of the shape (bucket type central rear seat) of the seat of the car.

Second Embodiment

This embodiment is described with reference to a juvenile safety car seat 2000 forming a receiving space by filling up a clearance between a support space defined by the juvenile safety car seat 2000 and a juvenile while rendering the capacity of the aforementioned receiving space variable in response to growth of the juvenile.

The structure of the juvenile safety car seat 2000 according to the second embodiment is schematically described with reference to FIGS. 30 and 31. The juvenile safety car seat 2000 has a structure allowing selection of a bed state shown in FIG. 30 and a seat state shown in FIG. 31 in response to physical growth of the juvenile.

More specifically, the juvenile safety car seat 2000 includes a seat body 2 and a base 4 supporting the seat body 2 to be rotatable and backwardly inclinable. The seat body 2 includes a backrest portion 6, a seat portion 8 and a headrest 10. The seat body 2 further includes side guards 2a and 2b, and the seat portion 8 includes armrests 8a and 8b.

Sleeping supports 12 and 14 slidable along and detachable from the side guards 2a and 2b are mounted on the side guards 2a and 2b.

A five-point safety belt for fixing the juvenile to the juvenile safety car seat 2000 is provided on the backrest portion 6 and the seat portion 8. This five-point safety belt has a crotch belt 16, located on the crotch of the juvenile, having a buckle 17 on its upper portion, lumbar belts 18 and 20, tongue plates 19 and 21 and shoulder belts 22 and 24.

The shoulder belts 22 and 24 are provided with a shoulder belt cover 25 for supporting the juvenile in a more preferable state. The backrest portion 6 is provided with shoulder belt receiving holes 6a for controlling the vertical positions of the shoulder belts 22 and 24 with respect to the juvenile.

The base 4 is provided with a footrest step 26 and a control lever 28 for controlling rotation and backward inclination of the seat body 2.

The importance of the juvenile safety car seat 2000 allowing selection of the aforementioned bed state is now described.

A baby, who is sometimes misidentified as a miniature adult, has still immature functions for existence, and hence improper sitting of the baby may result in a serious after effect. For example, the head of the baby, which is relatively heavy and supported by the weak cervical muscle, is weaker against a shock in a traffic accident or the like as compared with the remaining body parts.

Further, the cranial bone protecting the brain and the cerebral blood vessel of the baby are still insufficient in structure and function. For example, a baby under the age of one, particularly at the age of about six months, held in arms can be lightly handled. If the baby is strongly shaken back and forth, however, this may sometimes result in cerebral hemorrhage followed by an after effect or death of the baby.

In addition, it is important not to prevent the baby's abdominal respiration. Further, the nose of the baby is readily stuffed up, and if the baby is laid prone or in a position pressing the abdomen, there is a possibility of anoxia. In this case, abrupt cardiac arrest may result.

Thus, it is important to lay the baby before the age of six months on its back not to press its abdomen. Further, it can be said preferable that an actively moving baby over the age of six months is also laid on its back since the aforementioned physiological properties still remain.

In sufficient consideration of the aforementioned physiological properties of the baby, therefore, the juvenile safety car seat 2000, i.e., a child seat, allows selection of the aforementioned bed state in order to protect the baby in a car in the true sense and protect the brain, the neck and respiration of the baby.

The construction of child safety seats must take into account the developmental stages of the child during the first year after birth. These stages or periods include a newborn period, an infancy period and a childhood period. The changing characteristics of the child define these periods as follows. During the newborn period the child's weight is normally at least 2.5 kg.

The average daily sleeping hours are about 18 to 22 h.

The head is unsteady and the neck is still unfixed.

The lumbar region is also unsteady.

The head is heavy, the weight of the brain is 400 g, and its size is about one quarter of the grown size.

The cranial bone is thin and soft.

The blood vessels are so weak that a strong vibration readily results in intracerebral hemorrhage.

Respiratory obstruction may result depending on the body position.

Abdominal respiration takes place through a swollen abdomen.

The baby is sensitive to sonic, photic or vibratory stimulation.

The hip joint is readily dislocated.

The baby remarkably grows in height and weight.

Figure 33:
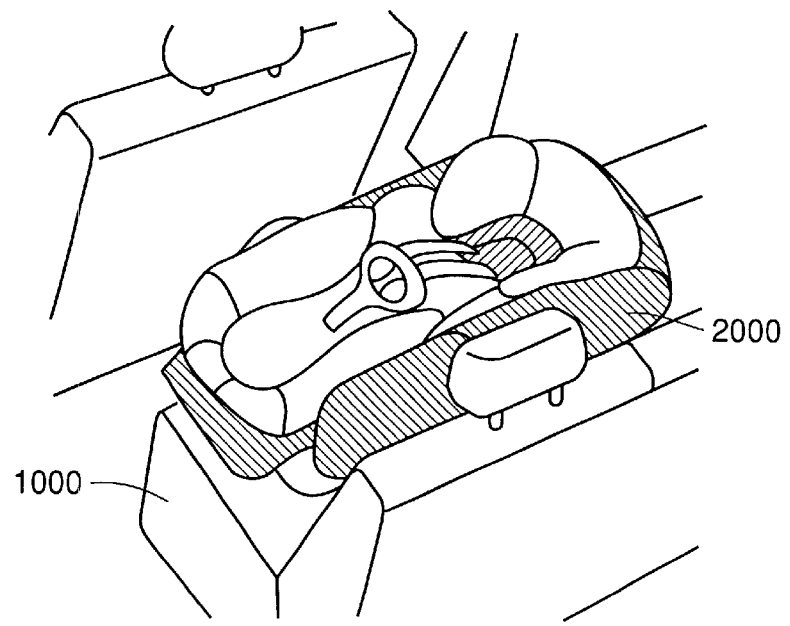
FIG. 33 is a perspective view showing a neonatal bed mode, suitable to the habits or growth of a baby in a neonatal period, of the child safety car seat to which the protector is attached.

The baby of the aforementioned newborn period is laid on a flat bed supporting its neck straight, allowing easy respiration and pressing the abdomen with a neonatal pad employing a cushion structure must be avoided while protecting the body, particularly the head of the baby against vibration caused by a collision. As shown in FIG. 33, therefore, it is preferable to use the child safety car seat 2000 on a rear seat 1000 of a car in the bed state perpendicularly to the traveling direction.

The infancy period covers the age of two, three or more months when the weight is at least 5.5 kg.

The average daily sleeping hours are about 16 to 20 h.

The lumbar region is still unsteady.

The specific gravity of the head is still large as compared with the weight.

The cranial bone is still thin and soft.

The blood vessels are so weak that strong vibration readily results in intracerebral hemorrhage.

Abdominal respiration takes place through a swollen abdomen.

The baby gradually feels comfort or discomfort in response to vibrations.

The baby remarkably grows in height and weight.

Figure 34:
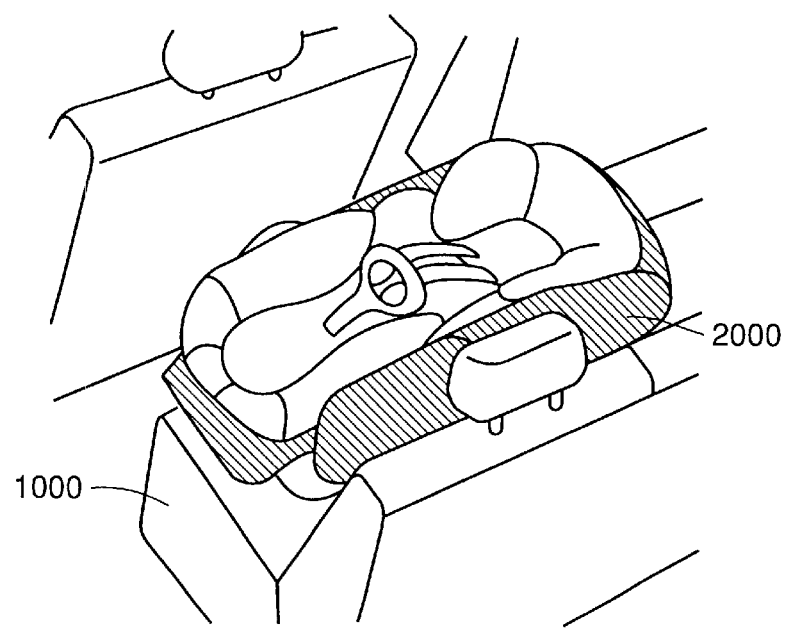
FIG. 34 is a perspective view showing an infantile bed mode, suitable to the habitus of an infantile baby, of the juvenile safety car seat to which the protector is attached.

The baby in infancy is laid on a flat bed protecting the heavy head of the baby against strong vibrations upon collision while avoiding to press the abdomen, with an infant pad employing a cushion structure for protecting the head and the body of the baby against strong vibrations. The required protection must take into account the growth of the baby. As shown in FIG. 34, therefore, it is preferable to use the child safety car seat 2000 on the rear seat 1000 of the car in the bed state perpendicularly to the traveling direction.

The childhood covers the age of six, seven or more months when the child's weight is at least 7.0 kg, but less than 10.0 kg.

The average daily sleeping hours are about 12 to 13 h.

The specific gravity of the head is still large as compared with the weight.

The cranial bone and the blood vessels are still weak as compared with an adult.

The baby actively moves the body and likes to move its limbs without restrictions.

The baby further feels comfort or discomfort in response to vibrations.

The baby starts to feel interested in outside scenes.

Figure 35:
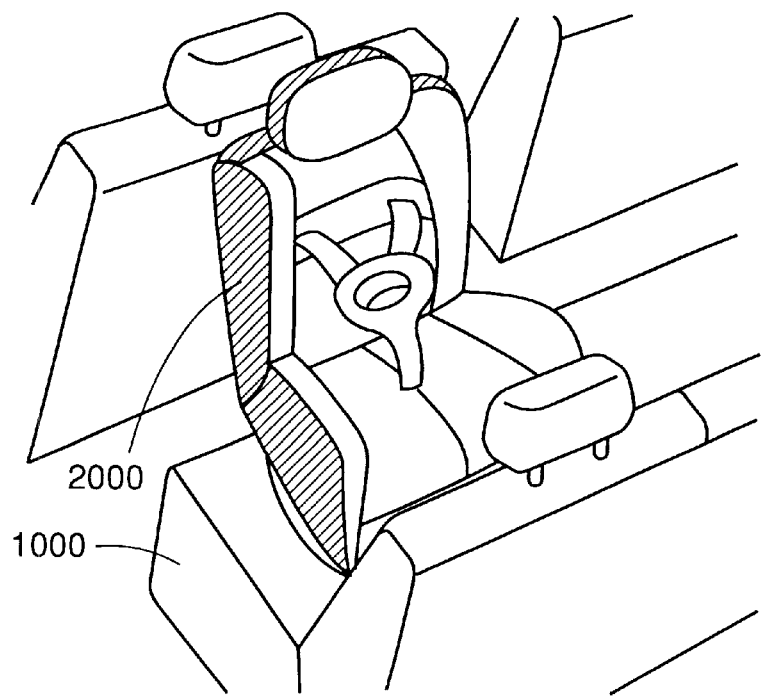
FIG. 35 is a perspective view showing a child seat mode, suitable to the habits of a baby in childhood, of the juvenile safety car seat to which the protector is attached

The cranial bone and the blood vessels of the baby in childhood having a stable lumbar region are still immature, and hence it is preferable to use a baby bed as long as possible. Also when using the juvenile safety car seat 2000 as a child seat, it is preferable to use the juvenile safety car seat 2000 on the rear seat 1000 of the car backward against the traveling direction, as shown in FIG. 35.

Figure 32:
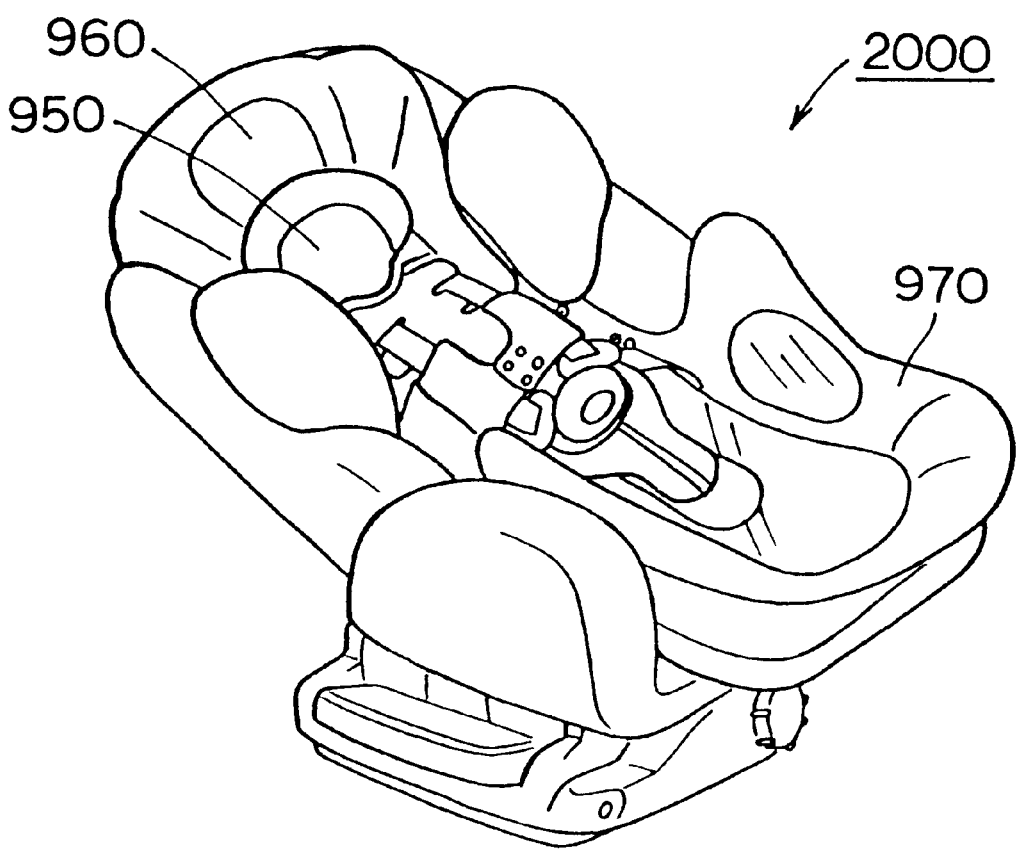
FIG. 32 is a total perspective view showing the juvenile safety car seat according to the second embodiment of the present invention, to which a protector is attached.

In consideration of the above, the juvenile safety car seat 2000 according to this embodiment is provided with a protector consisting of a flexible material, which is arranged between the support space defined by the juvenile safety car seat 2000 and the juvenile for forming a receiving space while rendering the capacity of the receiving space variable in response to growth of the juvenile and supporting the juvenile in a comfortable and safe state, as shown in FIG. 32.

This protector is constructed for a child, particularly a newborn baby or an infant, and has an inner head protector 950 for protecting the brain, the neck and respiration of the child, an outer head protector 960 for protecting a head space and a shoulder space, and a body protector 970 for protecting the shoulder space, an abdominal space and a leg space in particular.

Figure 36:
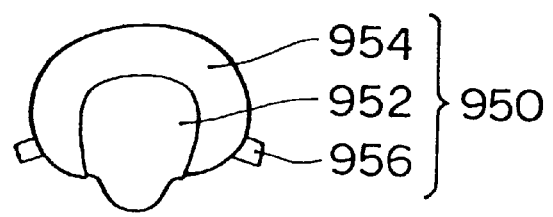
FIG. 36 is a plan view showing the structure of an inner head protector 950 according to the second embodiment.

As shown in FIG. 36, the inner head protector 950 has a bottom inner head protector 952, a side inner head protector 954 provided to cover the bottom inner head protector 952 and attachment belts 956 for attaching the inner head protector 950 to the outer head protector 960.

Figure 37:
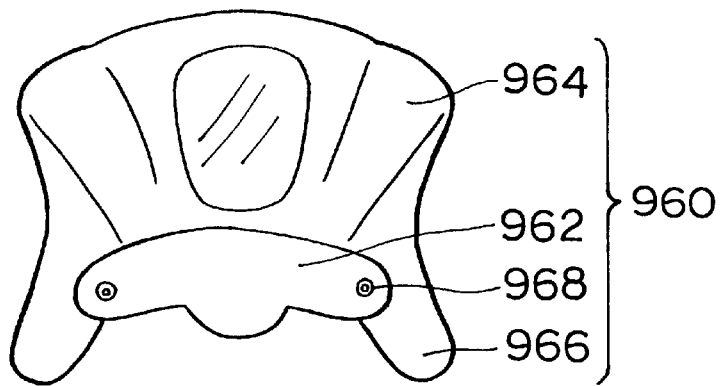
FIG. 37 is a plan view showing the structure of an outer head protector 960 according to the second embodiment.

As shown in FIG. 37, the outer head protector 960 has a bottom outer head protector 962, an upper outer head protector 964 and side outer head protectors 966. A plurality of hook members 968 are provided in the vicinity of front end portions of the bottom outer head protector 962 and on the back surfaces of the side outer head protectors 966, for controlling the height of the side outer head protectors 966 and coupling the outer head protector 960 with the body protector 970.

Figure 38:
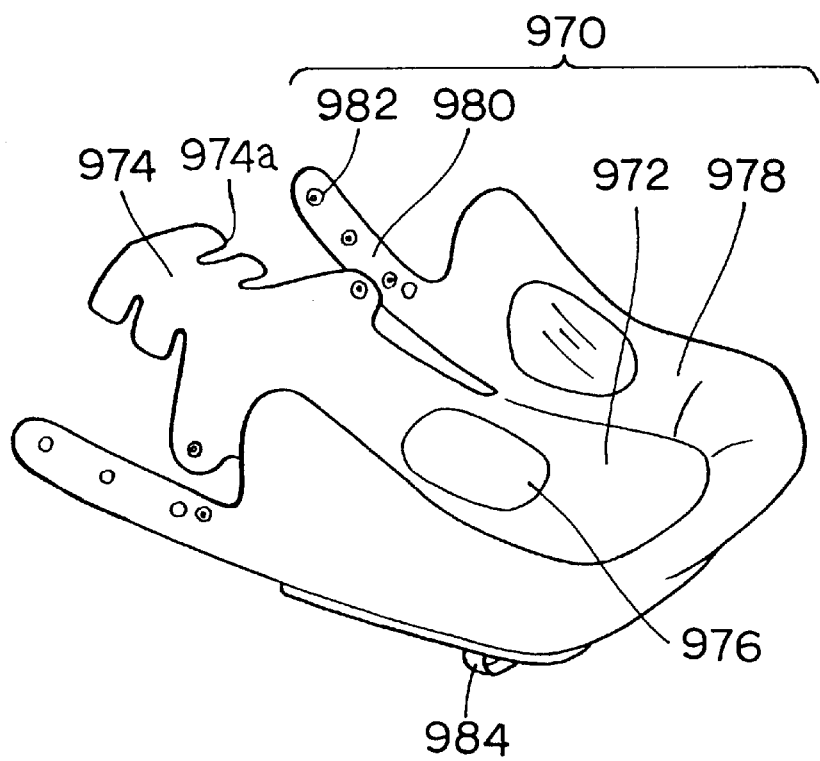
FIG. 38 is a plan view showing the structure of a body protector 970 according to the second embodiment.

As shown in FIG. 38, the body protector 970 has a bottom body protector 972, a back body protector 974, an opening 976 for receiving the crotch belt 16, side body protectors 978 and control belts 980. The back body protector 974 is provided with a plurality of slits 974a for opening the shoulder belt receiving holes 6a provided on the backrest portion 6.

A plurality of hook members 982 are provided in the vicinity of a coupling portion between the bottom body protector 972 and the back body protector 974 and on the control belts 980, for fixing the body protector 970 to the seat portion 8 and coupling the body protector 970 with the outer head protector 960. Further, an attachment belt 984 is provided on the back surface of the bottom body protector 972, for fixing the body protector 970 to the seat portion 8.

Attachment of the inner head protector 950, the outer head protector 960 and the body protector 970 having the aforementioned structures to the juvenile safety car seat 2000 is now described with reference to FIGS. 39 to 46.

Figure 39:
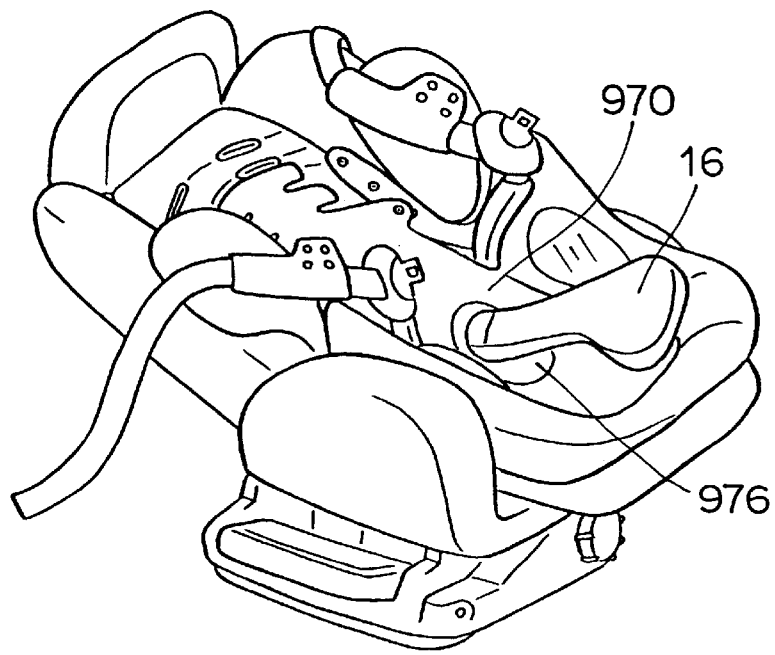
FIGS. 39 to 41 are first to third perspective views showing attachment of the body protector 970 to a juvenile safety car seat 2000 according to the second embodiment.
Figure 40:
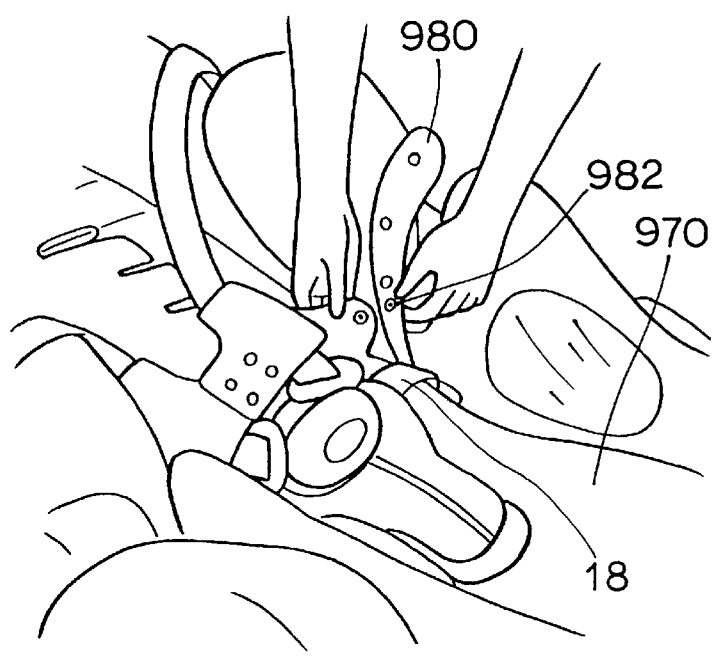
Figure 41:
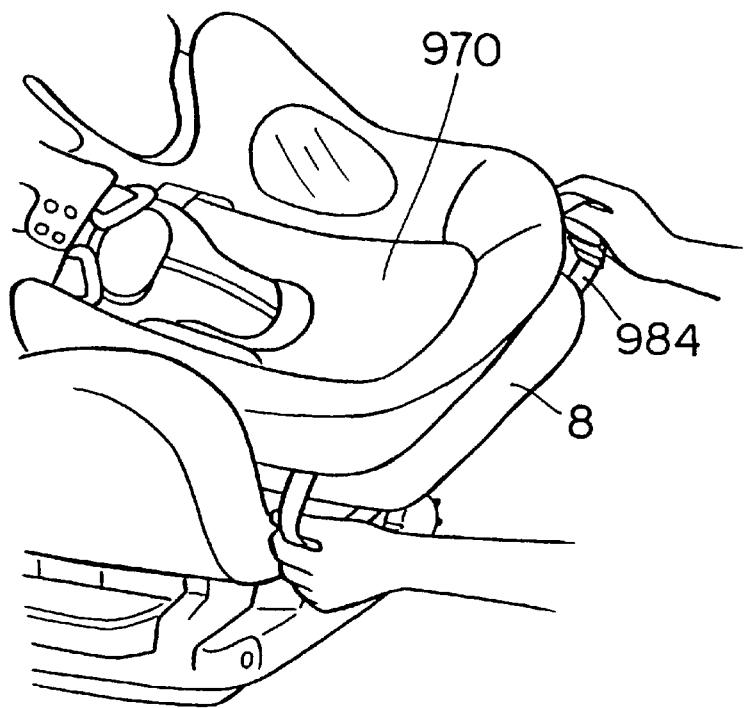

In order to attach the body protector 970 to the juvenile safety car seat 2000, the crotch belt 16 is passed through the opening 976 and thereafter the control belts 980 are arranged around the lumbar belts 18 and 20 and positioned by the hook members 982, as shown in FIGS. 39 to 41. The attachment belt 984 provided on the back surface of the bottom body protector 972 is hung on the seat portion 8.

Figure 42:
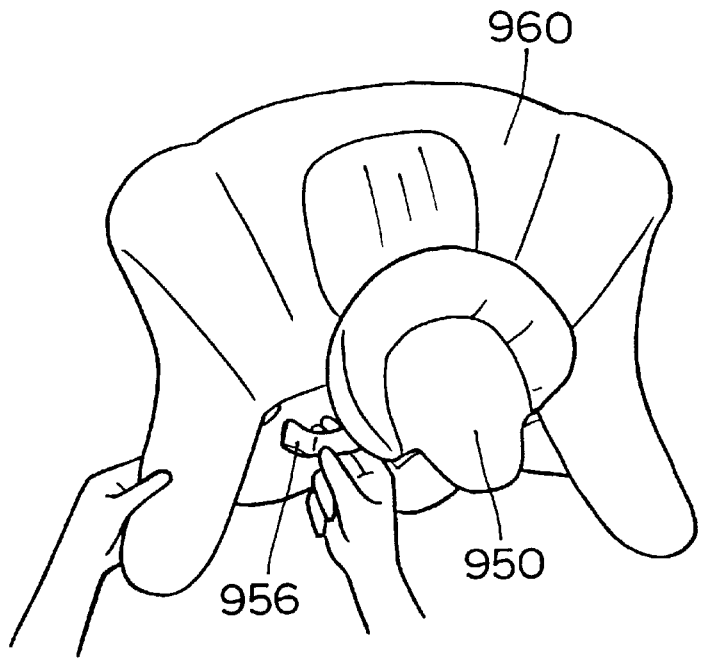
FIGS. 42 to 44 are first to third perspective views showing attachment of the inner head protector 950 to the outer head protector 960 in the second embodiment.
Figure 43:
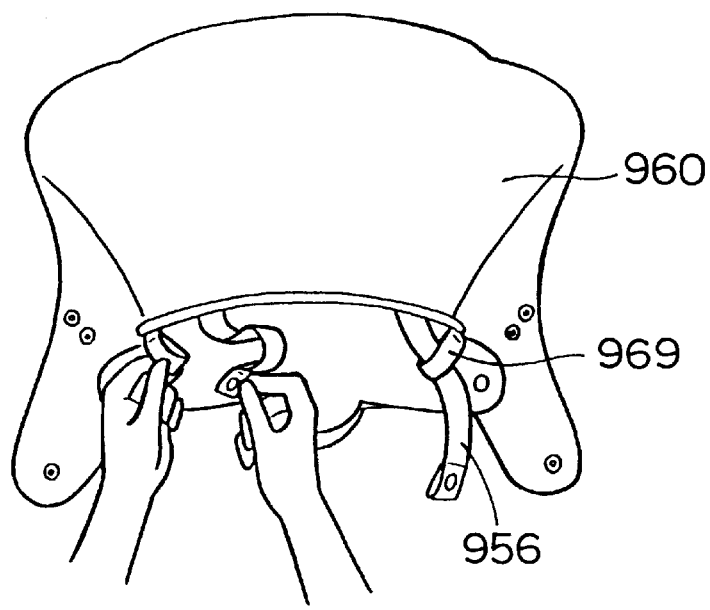

The inner head protector 950 is fixed to the outer head protector 960 with the attachment belts 956, as shown in FIGS. 42 and 43.

Figure 44:
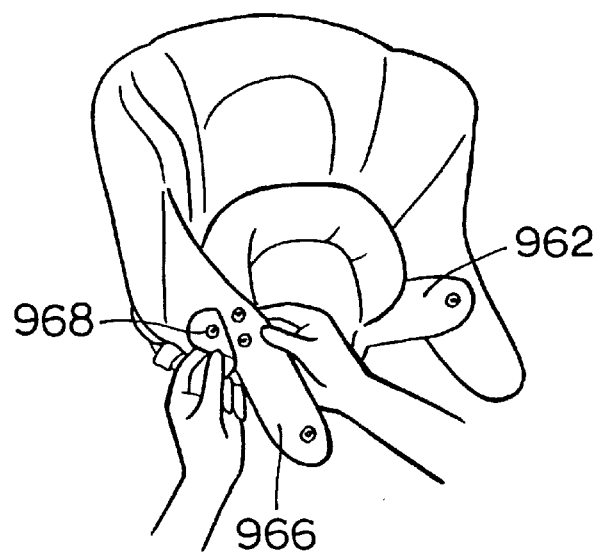

As shown in FIG. 44, the space between and the height of the side outer head protectors 966 are previously controlled through the hook members 968 as shown in FIG. 44, so that the outer head protector 960 fits the habitus of the juvenile. In order to attach the outer head protector 960, the hook members 968 and 982 provided on the side outer head protectors 966 and the control belts 980 of the body protector 970 respectively are coupled with each other to come to positions responsive to the height of the juvenile, as shown in FIGS. 45 and 46.

Figure 45:
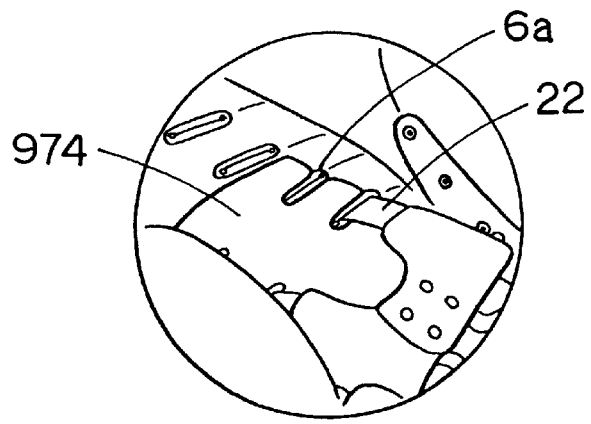
FIGS. 45 and 46 are first and second perspective views showing connection of the outer head protector 960 and the body protector 970 in the second embodiment.
Figure 46:
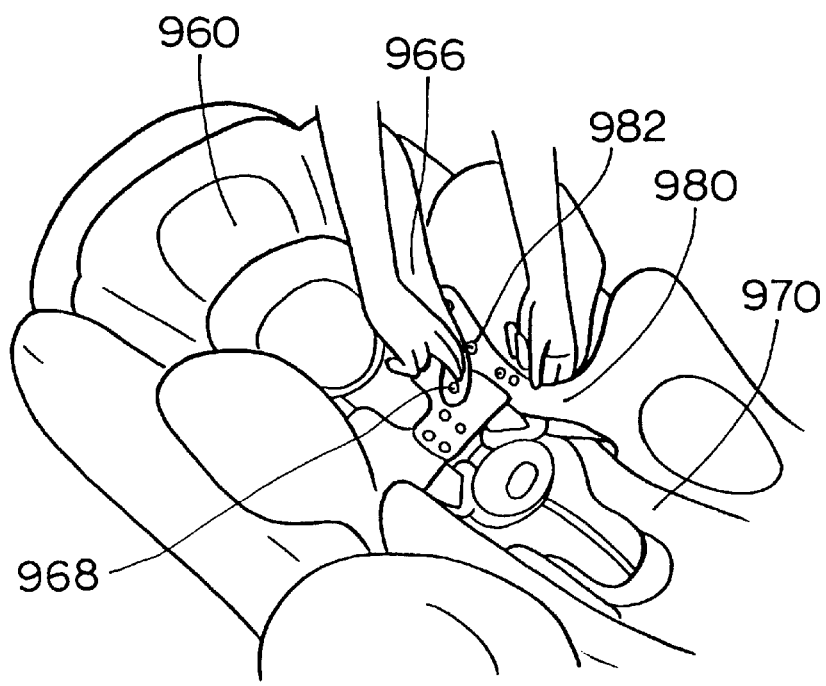

At this time, the position of the body protector 970 is so controlled that the positions of the slits 974a provided on the back body protector 974 align with those of the shoulder belt receiving holes 6a, as shown in FIG. 45.

Figure 47:
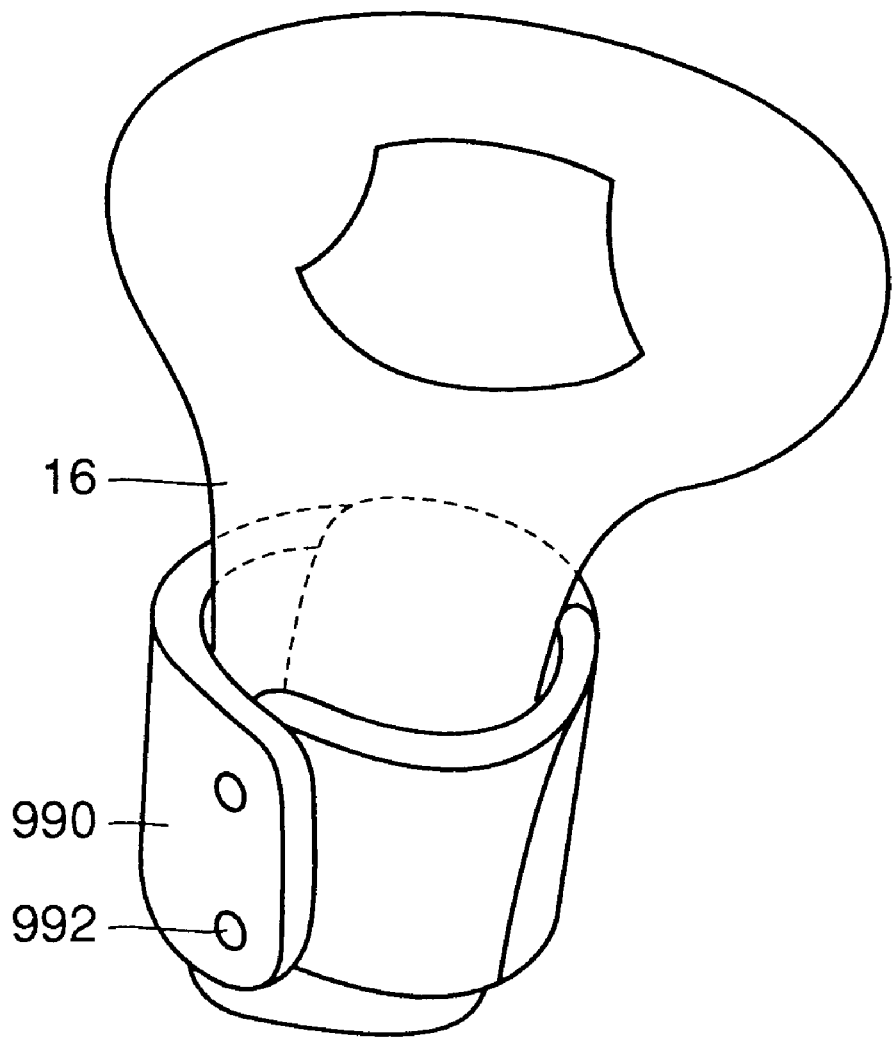
FIG. 47 is a perspective view showing attachment of a crotch belt 16 to a crotch protector 990 in the second embodiment.

As shown in FIG. 47, a crotch protector 990 may be attached to the crotch belt 16 with hook members 992 provided thereon for controlling the distance between the crotch of the juvenile and the crotch belt 16 at need.

While all of the inner protector 950, the outer head protector 960 and the body protector 970 are attached to the juvenile safety car seat 2000 in FIG. 32, these protectors may be properly selected and used as needed.

When employing the aforementioned protectors 950, 960 and 970, therefore, it is possible to select four guard modes, i.e., a quadruple guard with the side guards 2a and 2b, the sleeping supports 12 and 14, the outer head protector 960 and the inner head protector 950, a triple guard with the side guards 2a and 2b, the sleeping supports 12 and 14 and the outer head protector 960, a double guard with the side guards 2a and 2b and the sleeping supports 12 and 14 and a single guard with only the side guards 2a and 2b in an upper space region including the head space region and the shoulder space region for the juvenile.

In particular, the quadruple guard provides a remarkably important protection for a newborn child or an infant whose brain and neck are still insufficiently developed.

In a lower space region including the abdominal space region and the leg space region for the juvenile, it is possible to select two guard modes, i.e., a double guard with the armrests 8a and 8b and the body protector 970 and a single guard with only the armrests 8a and 8b.

Thus, it is possible to protect the head space region, the shoulder space region, the abdominal space region and the leg space region enclosing the juvenile with a capacity responsive to growth of the juvenile. Consequently, the juvenile safety car seat 2000 employing the protectors 950, 960 and 970 can implement states most suitable to the three growth stages requiring particular features for protecting a baby and can be improved in comfortability and safeness for the juvenile by properly changing the modes of the inner head protector 950, the outer head protector 960 and the body protector 970.

Third Embodiment

The structure of a protector 3000 according to a third embodiment of the present invention is now described with reference to FIGS. 48 to 59.

The structure of the protector 3000 is now described with reference to FIG. 48. The protector 3000, employed along with the juvenile safety car seat 2000, is provided to allow selection of a neonatal bed mode suitable for a newborn baby, or an infant or a child.

This protector 3000 has a function for properly filling up a clearance defined between a space and a neonatal or infantile baby by changing the mode in response to growth of the baby in a state used in the neonatal bed mode or the infantile bed mode in particular.

More specifically, the protector 3000 is integrally provided with a first head protector 3002 protecting the head of the baby from below, a second head protector 3005 protecting the head of the baby from above and from both sides, a first body protector 3001 supporting the body of the baby from below, and a pair of second body protectors, provided on both sides of the first body protector 3001, supporting the body of the baby from both sides.

According to this embodiment, the second body protectors include upper second body protectors 3006 and 3007 and lower second body protectors 3008 and 3009.

Openings SL3, SL4 and SL5 for attaching a first head pad 4000 or a second head pad 5000 described later are provided on the boundary between the first head protector 3002 and the second head protector 3005.

Slits SL1 and SL2 having horizontal openings are provided on the boundary between the second head protector 3005 and the first body protector 3001, so that the shoulder belts 22 and 24 provided on the juvenile safety car seat 2000 pass through the slits SL1 and SL2.

The second head protector 3005 and the upper second body protectors 3006 and 3007 are attachable to/detachable from each other with snap fasteners A1 and A2, while the upper second body protectors 3006 and 3007 and the lower second body protectors 3008 and 3009 are attachable to/detachable from each other with snap fasteners A3 and A4. Further, openings are provided on coupling portions between the upper second body protectors 3006 and 3007 and the lower second body protectors 3008 and 3009, so that the lumbar belts 18 and 20 provided on the juvenile safety car seat 2000 pass through these openings.

The first body protector 3001 is provided with an opening 3003, so that the buckle 17 provided on the juvenile safety car seat 2000 passes through the opening 3003. the first body protector 3001 is provided on its lower end with a flap 3001a, so that the lower ends of the second body protectors 3008 and 3009 and the flap 3001a of the first body protector 3001 can be coupled with each other by bending the flap 3001a upward.

Figure 49:
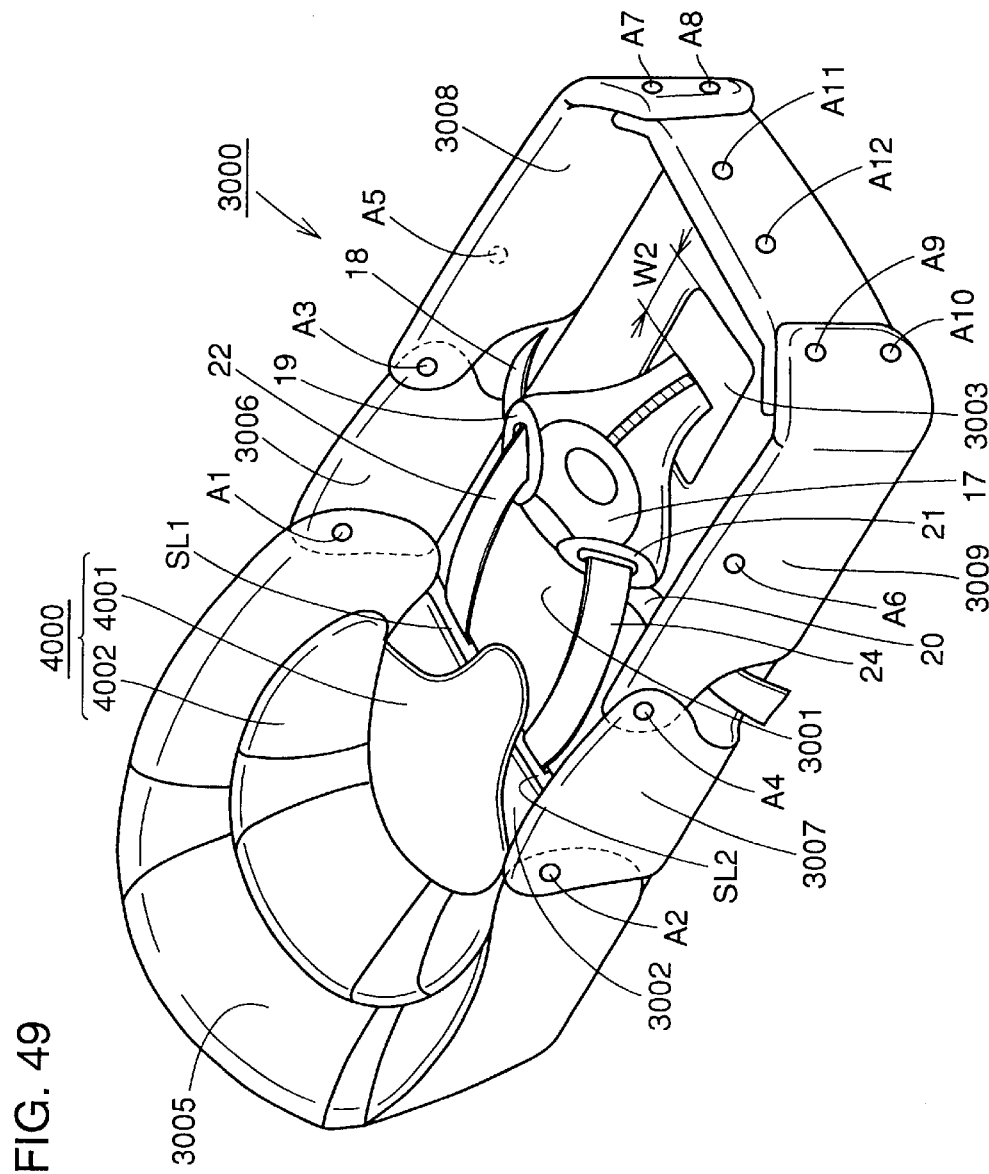

Referring to FIG. 49, the first head pad 4000 is attached to the first head protector 3002 and the second head protector 3005. This first head pad 4000 is attachable or detachable through the openings SL3, SL4 and SL5. The first head pad 4000 includes a bottom pad 4001 protecting the head of the baby from below and a guard pad 4002 protecting the head of the baby from above and from both sides.

The flap 3001a provided on the lower end of the first body protector 3001 is bent upward so that the lower ends of the second body protectors 3008 and 3009 and the flap 3001a of the first body protector 3001 are detachably coupled with each other with snap fasteners A7 to A10.

Further, snap fasteners A5, A6, A11 and A12 for attachably/detachably providing a leg cover 7000 described later are provided on the side surfaces of the second body protectors 3008 and 3009 and the back surface of the flap 3001a.

Figure 50:
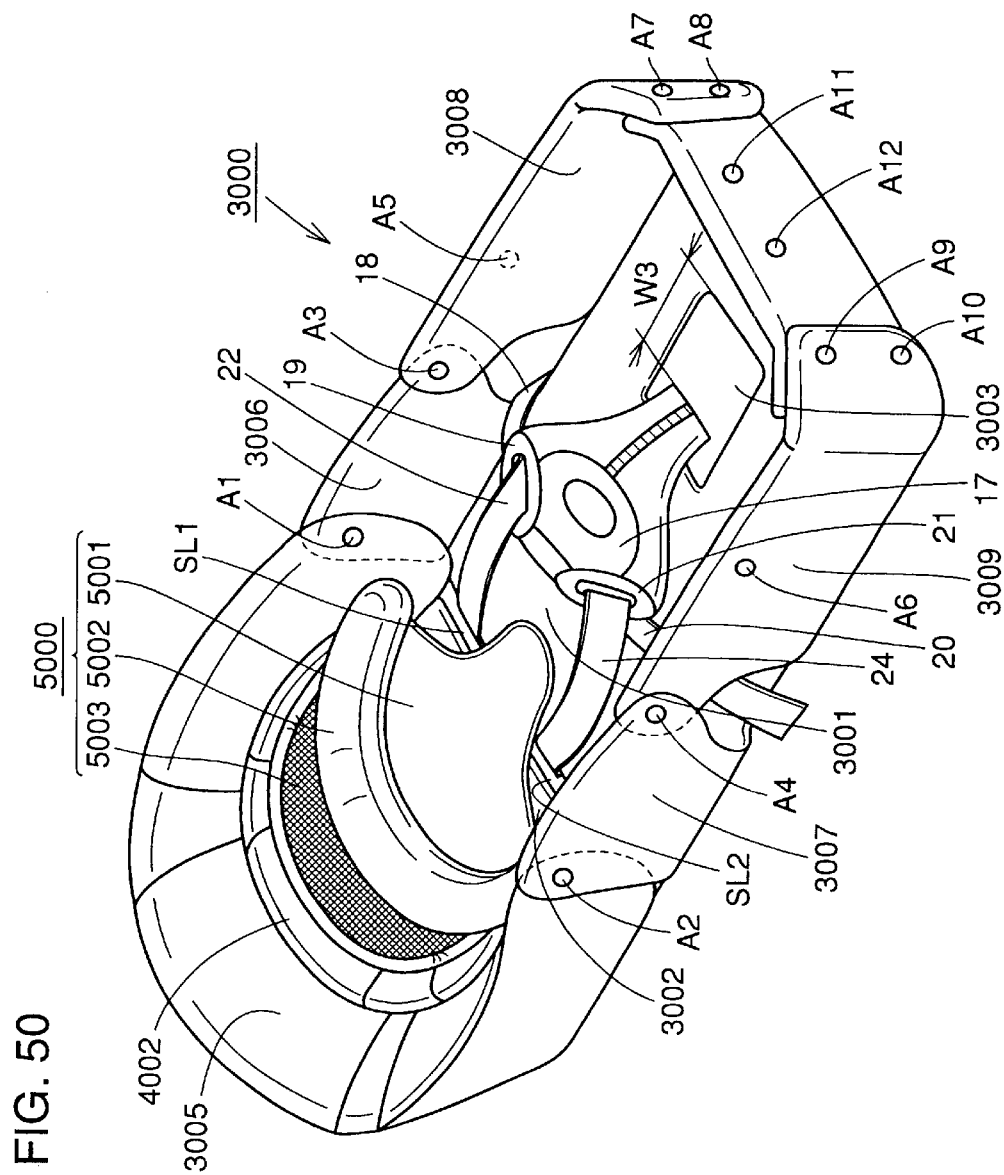

Referring to FIG. 50, the second head pad 5000 is attached to the first head protector 3002 and the second head protector 3005. The second head pad 5000 is attachable/detachable through the openings SL3, SL4 and SL5.

Figure 51:
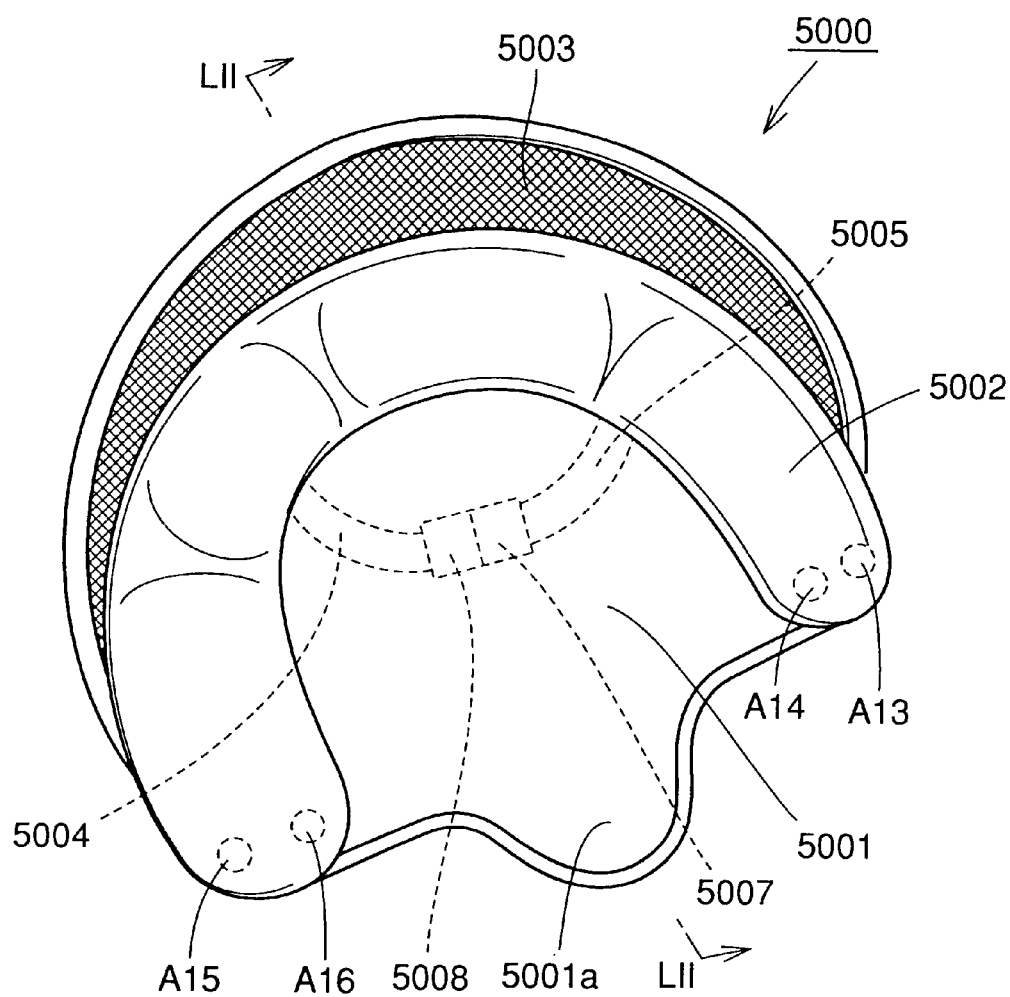
FIG. 51 is a perspective view showing the structure of a second head pad 5000.

As shown in FIGS. 50 and 51, the second head pad 5000 includes a bottom pad 5001 protecting the head of the baby from below, a guard pad 5002 protecting the head of the baby from above and from both sides, and a domy sunshade 5003 for shielding the baby against exposure to light.

Snap fasteners A13, A14, A15 and A16 are provided between the forward end of the guard pad 5002 and the bottom pad 5001, so that the space of the guard pad 5002 is controllable.

Figure 52:
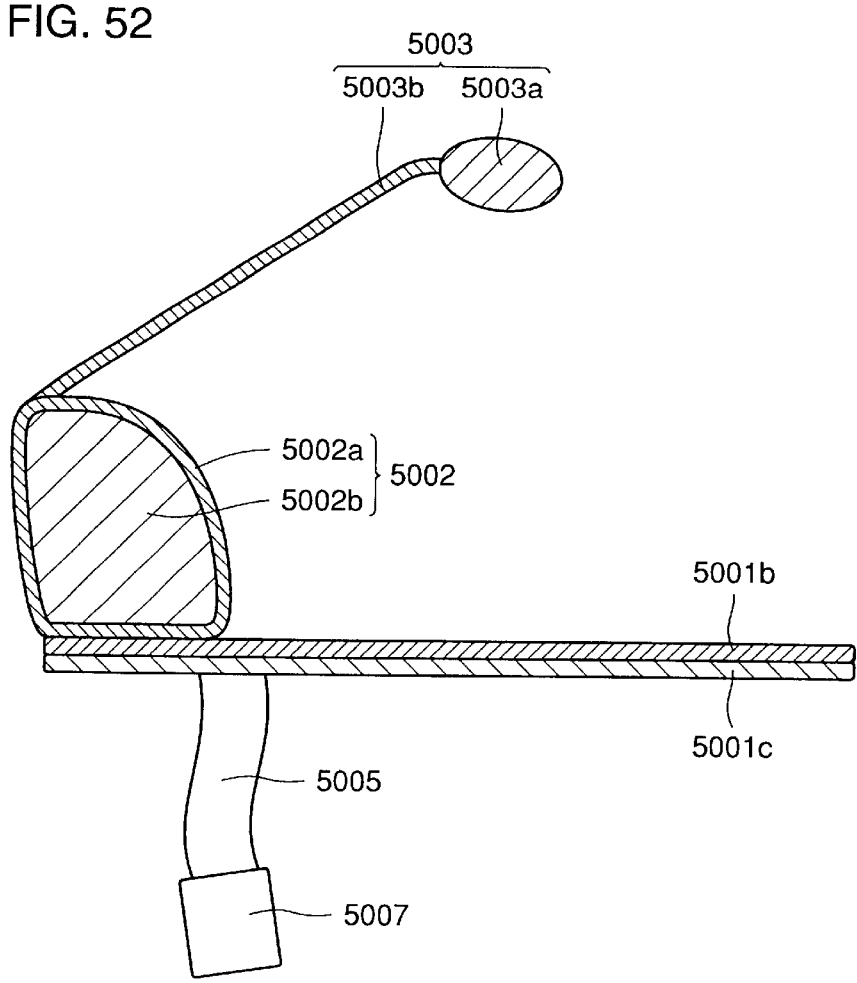
FIG. 52 is a sectional view taken along the line LII—LII in FIG. 51.

FIG. 52 shows the structure of the second head pad 5000 in detail. This figure is a sectional view taken along the line LII—LII in FIG. 51. The bottom pad 5001 is provided with a front surface member 5001b consisting of a material having air permeability on the side of the baby's head and with a back surface member 5001c having a cushiony property on the rear side. The back surface member 5001c is provided with belts 5004 and 5005 and buckles 5007 and 5008, for fixing the second head pad 5000 through slits (not shown) provided on the first head pad 4000.

The guard pad 5002 is provided with a surface member 5002*a* having air permeability and a core member 5002 prepared from a silicon specific gel having continuous bubble structure, which is a silicon foaming agent (ten-time foaming). The silicon specific gel can effectively absorb a shock and put the baby at ease since the same feels approximate to the mother's breast.

While specific materials for the respective parts of the protector 3000 according to this embodiment are not mentioned in the above, it is possible to effectively absorb a shock and put the baby at ease by employing the silicon specific gel for at least regions coming into contact with the baby.

The sunshade 5003 includes a sunshade body 5003*b* formed by a member having a shielding property and an edge portion 5003*a*, maintaining the dome shape of the sunshade body 5003*b*, provided in view of design.

The protector 3000 shown in FIGS. 49 or 50 and having the aforementioned structure is particularly suitable for a newborn baby or infant. The first head pad 4000 or the second head pad 5000 enables at least a triple guard for the head of the baby along with the side guards 2*a* and 2*b* of the juvenile safety car seat 2000. When the integrally formed protector 3000 according to this embodiment is located most downward with respect to the child safety car seat 2000 (the clearance between the buckle 17 and the opening 3003 is W3 or W2), the space between the head portion and the crotch portion is controlled in response to the length of the body of the baby, for supporting the baby in a space suitable to its current stage of development.

Figure 48:
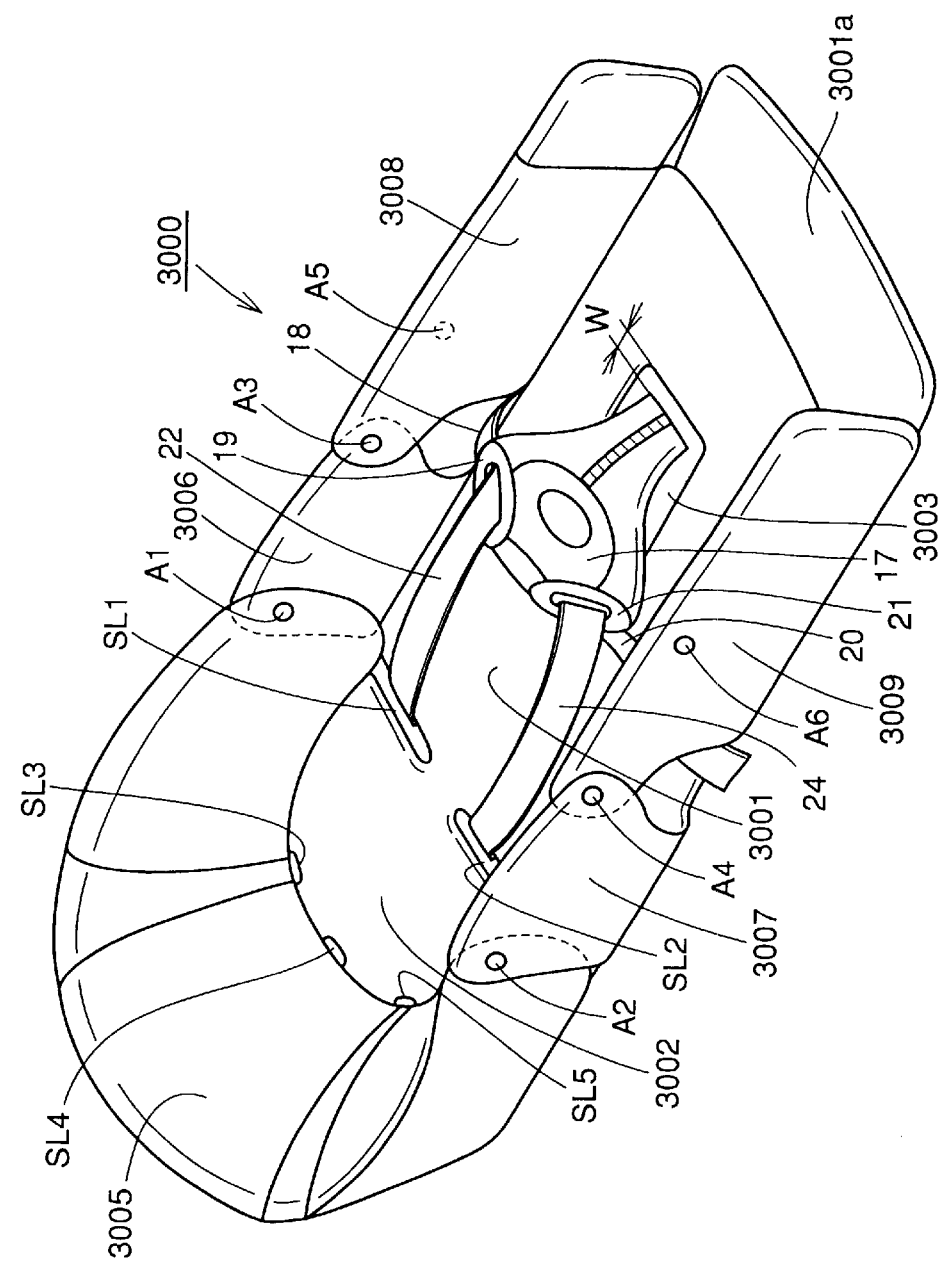
FIGS. 48 to 50 are first to third perspective views showing the overall structure of a protector 3000 according to a third embodiment of the present invention.

FIG. 48 shows an infantile bed mode suitable to the growth of a baby in infancy or childhood. When the first head pad 4000 or the second head pad 5000 is detached and the integrally formed protector 3000 according to this embodiment is arranged on a prescribed position with respect to the juvenile safety car seat 2000 (the clearance between the buckle 17 and the opening 3003 is W) following growth of the baby, the space between the head portion and the crotch portion is controlled in response to the length of the body of the baby, for supporting the baby with a space suitable to its size.

Figure 30:
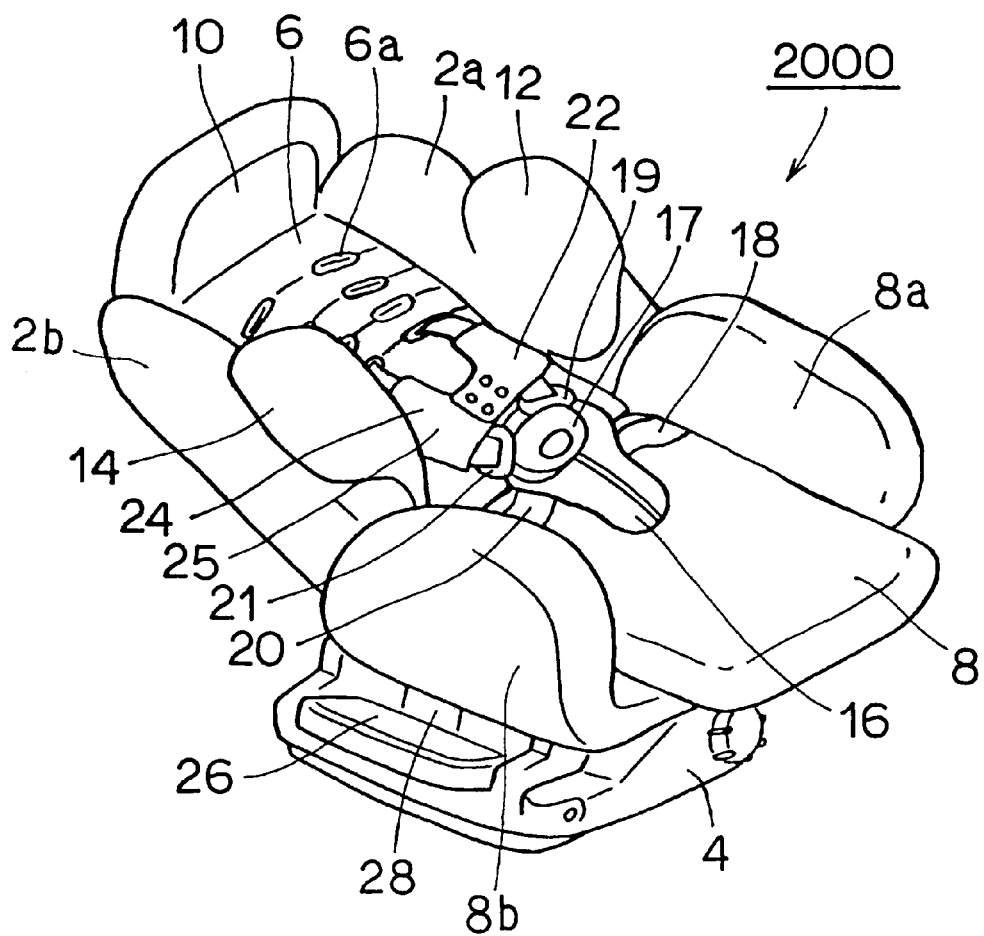
FIG. 30 is a total perspective view showing a first mode of a child safety car seat according to a second embodiment of the present invention.
Figure 31:
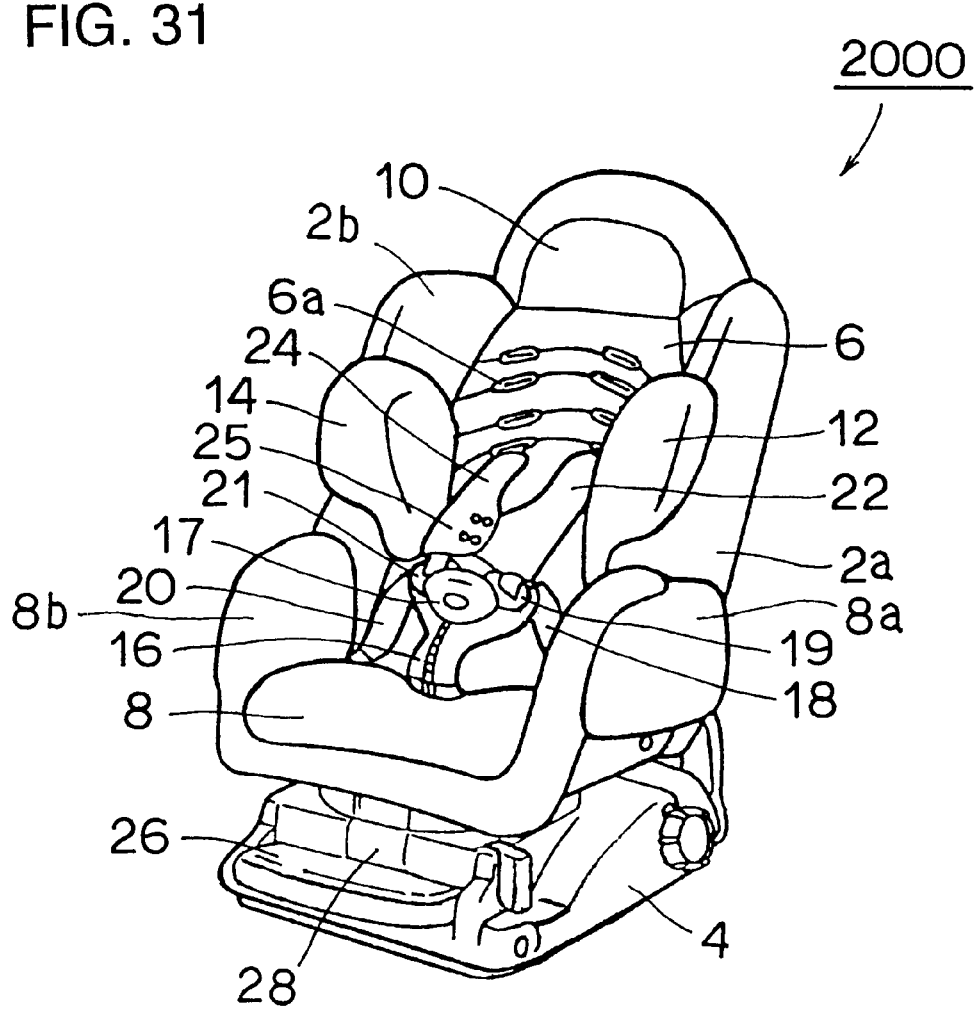
FIG. 31 is a total perspective view showing a second mode of the juvenile safety car seat according to the second embodiment of the present invention.

FIG. 30 shows a child bed mode suitable to the size of a baby in childhood. When the protector 3000 is detached following growth of the baby, it is possible to support the baby in a space suitable to its size.

Thus, the clearance defined between the space and the baby is properly filled up by changing the mode in response to growth of the baby in a neonatal period, in infancy or in childhood, while the baby is safely and comfortably supported in a lying state so that the brain and the neck of the baby are safely supported without hindering abdominal respiration.

Figure 53:
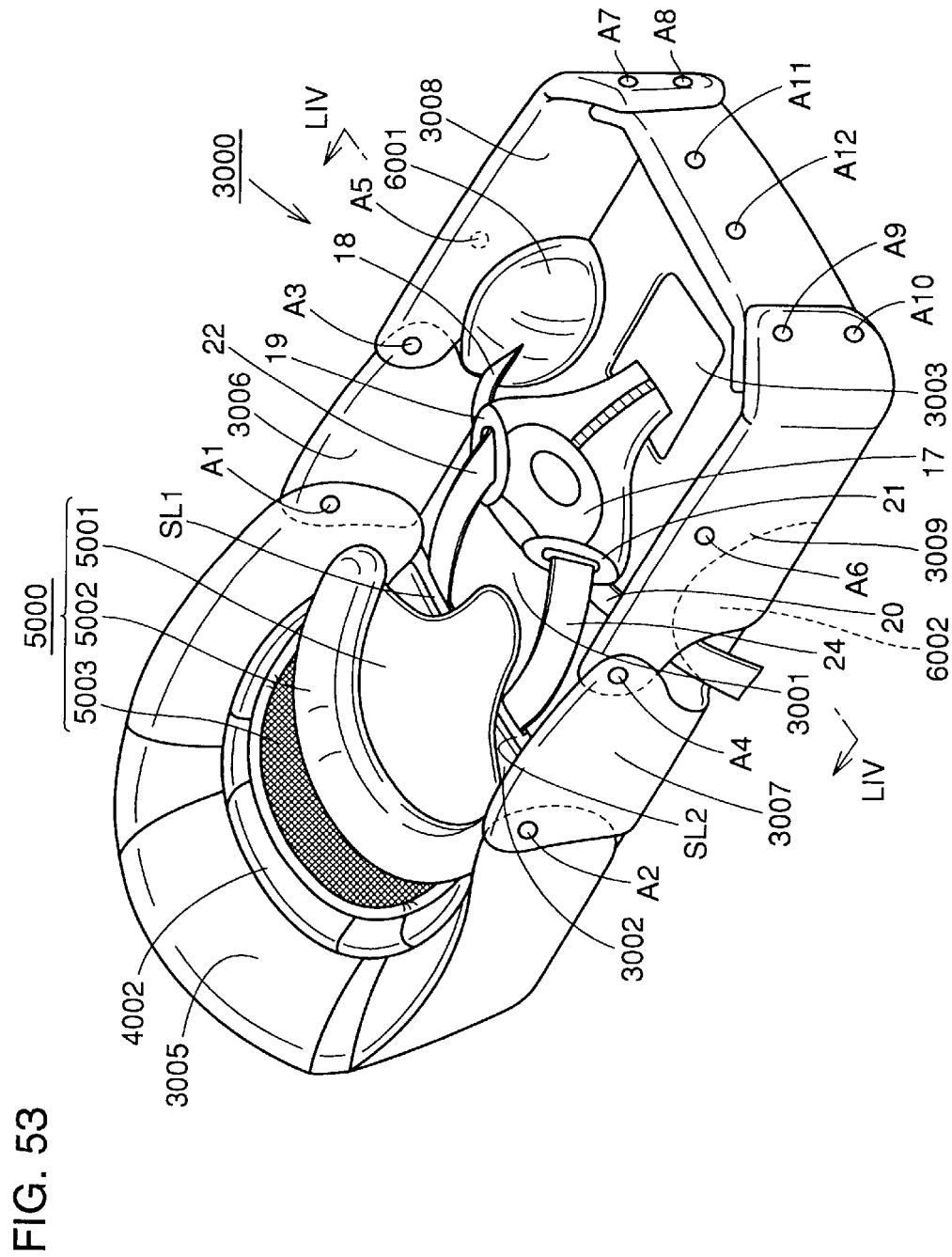
FIG. 53 is a perspective view showing a protector 3000 according to the third embodiment provided with lumbar pads 6001 and 6002.

In order to support the baby in a more preferably state, lumbar pads 6001 and 6002 are attachably/detachably provided inside the second body protectors 3008 and 3009 for protecting the lumbar region of the baby, as shown in FIG. 53.

Figure 54:
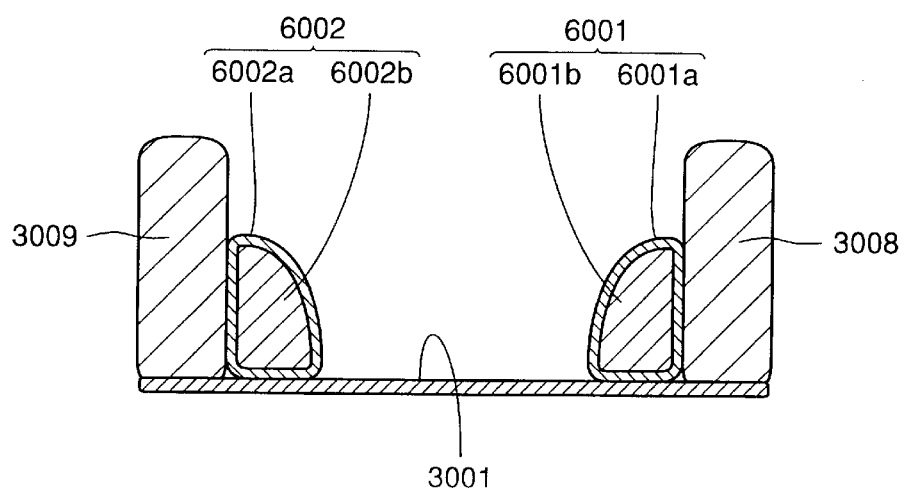
FIG. 54 is a sectional view taken along the line LIV—LIV in FIG. 53.

As shown in a sectional view of FIG. 54, the lumbar pads 6001 and 6002 are provided with surface members 6001*a* and 6002*a* having air permeability and core members 6001*b* and 6002*b* prepared from the silicon specific gel having a continuous bubble structure, which is a silicon foaming agent (ten-time foaming), similarly to the second head pad 5000. The silicon specific gel can effectively absorb a shock and can put the baby at ease since the same feels approximate to the mother's breast.

Figure 55:
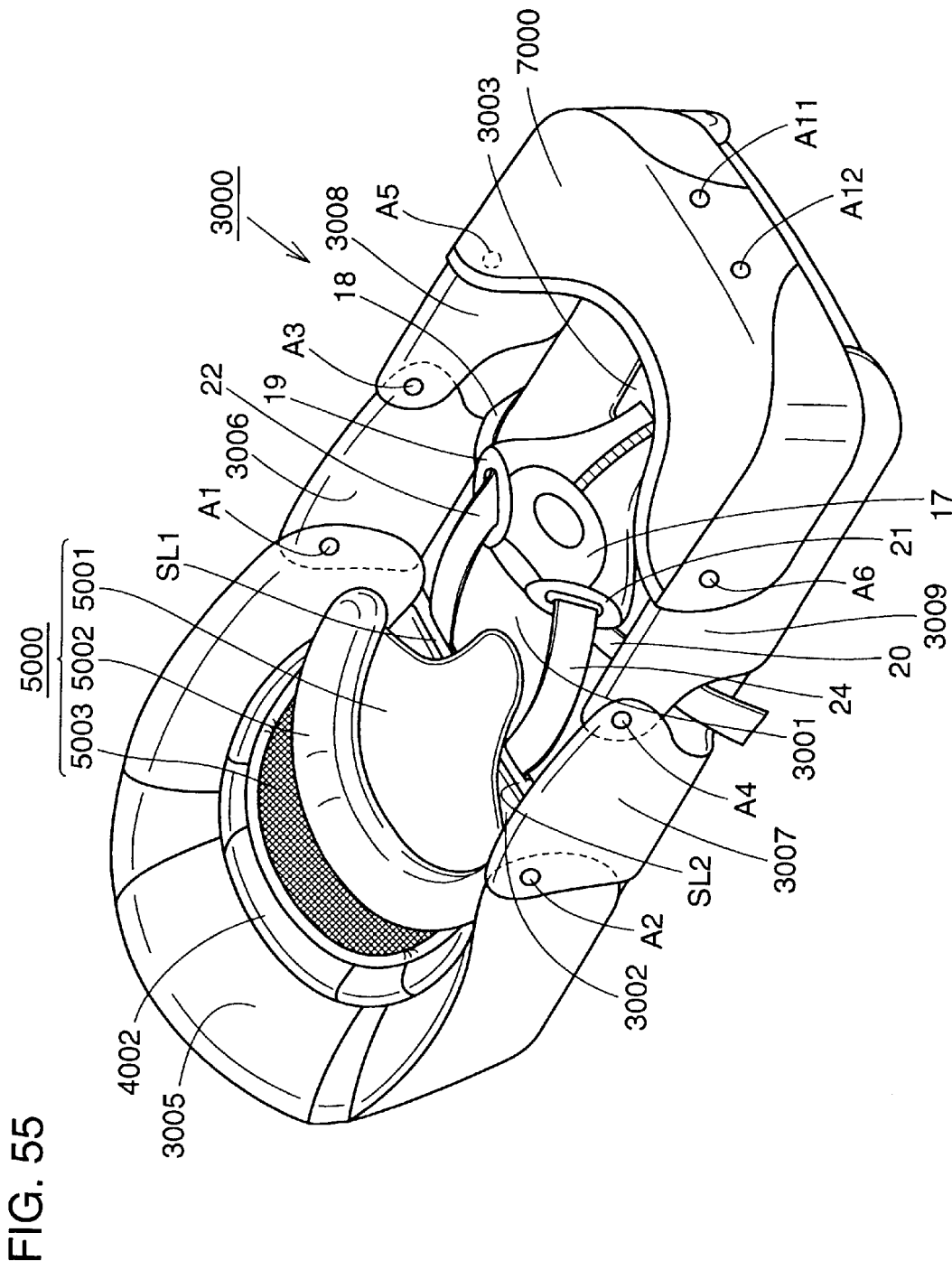
FIG. 55 is a perspective view showing the protector 3000 according to the third embodiment provided with a leg cover 7000.
Figure 56:
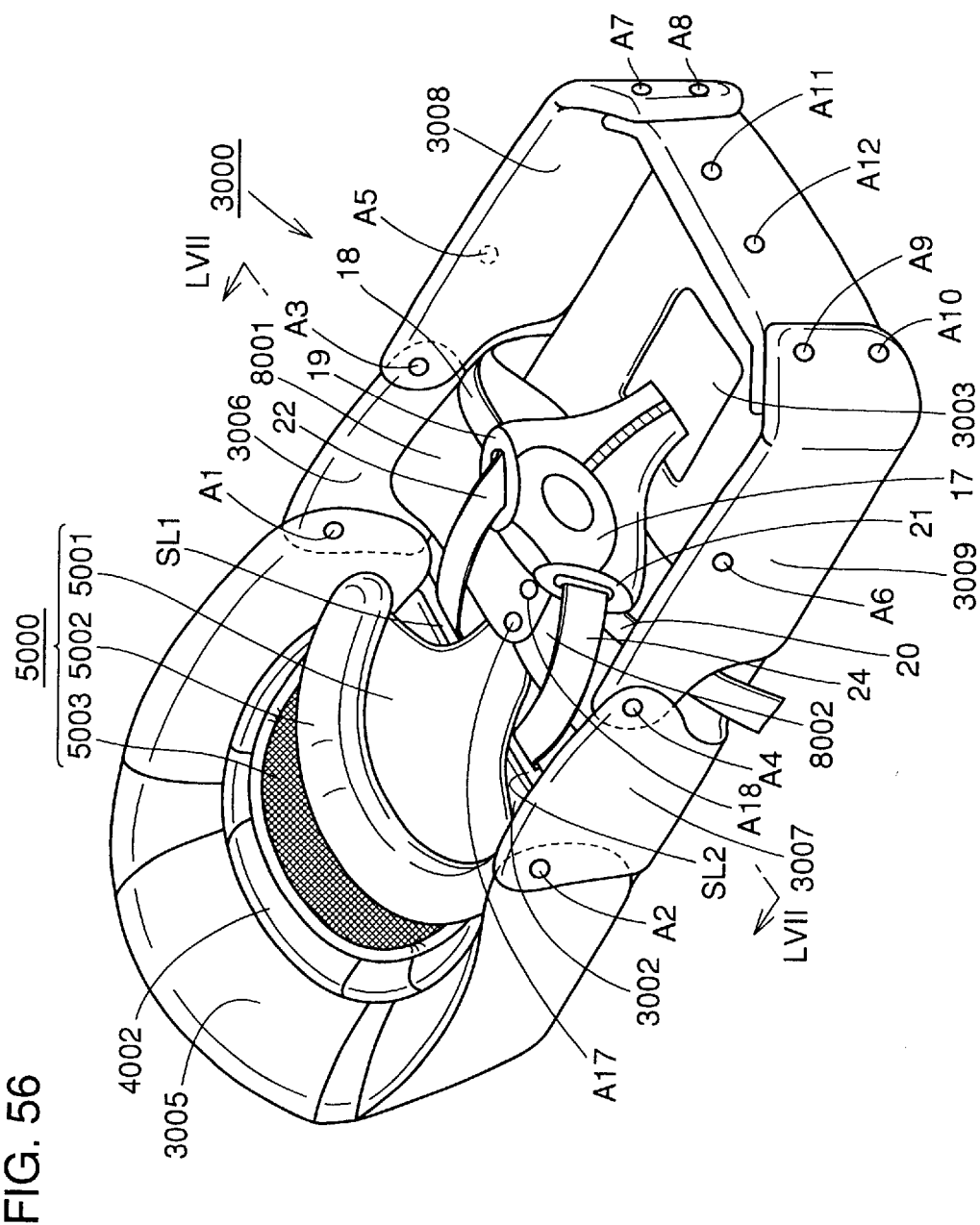
FIG. 56 is a perspective view showing the protector 3000 according to the third embodiment provided with body covers 8001 and 8002.

In order to support the baby in a more preferable state, the leg cover 7000 is provided to be attachable to/detachable from the protector 3000 with the snap fasteners A5, A6, A11 and A12 for protecting a portion close to the leg region of the baby from above, as shown in FIG. 55. Thus, the baby can be prevented from chilling caused by an air conditioner in the car particularly in air-conditioned driving.

In order to support the baby in a more preferable state, a pair of body covers 8001 and 8002 are provided to be openable/closable through a snap fastener A17 for covering the abdomen of the baby from above, as shown in FIG. 46.

Figure 57:
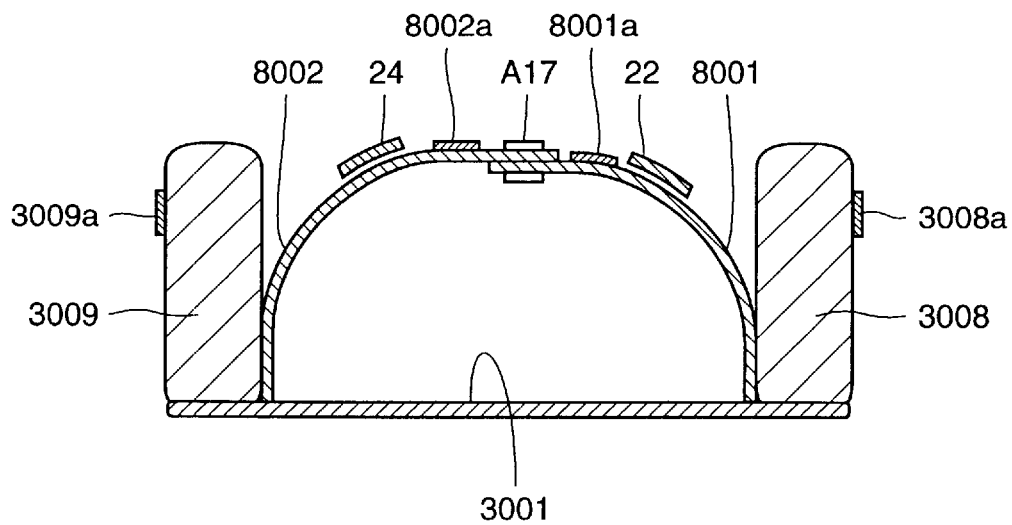
FIGS. 57 and 58 are sectional views, taken along the line LVII—LVII in FIG. 56, showing first and second used states.
Figure 58:
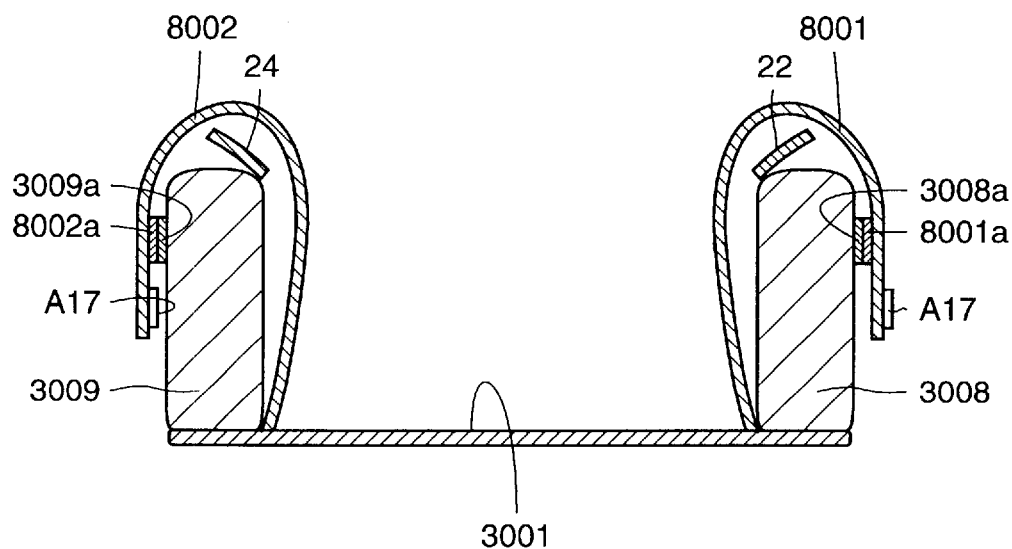

The body covers 8001 and 8002 covering the abdomen of the baby from above can temporarily fix the shoulder belts 22 and 24 (including the lumbar belts 18 and 20 and the tongue plates 19 and 21) on both sides by coupling hook-and-loop fasteners 8001*a* and 8002*a* provided on the outer sides of the body covers 8001 and 8002 with hook-and-loop fasteners 3008*a* and 3009*a* provided on the outer sides of the second body protectors 3008 and 3009 of the protector 3000 thereby maintaining the body covers 8001 and 8002 in outwardly open states as shown in FIGS. 57 and 58, for example. Thus, the baby can be smoothly put on/out of the juvenile safety car seat 2000 without hindrance by the shoulder belts 22 and 24 (including the lumbar belts 18 and 20 and the tongue plates 19 and 21).

Further, it is also possible to prevent the tongue plates 19 and 21 from temperature rise resulting from direct sunlight in summer.

Also in the leg cover 7000 and the body covers 8001 and 8002, it is possible to effectively absorb a shock and put the baby at ease by employing the silicon specific gel, feeling approximate to the mother's breast, for regions coming into contact with the baby.

Figure 59:
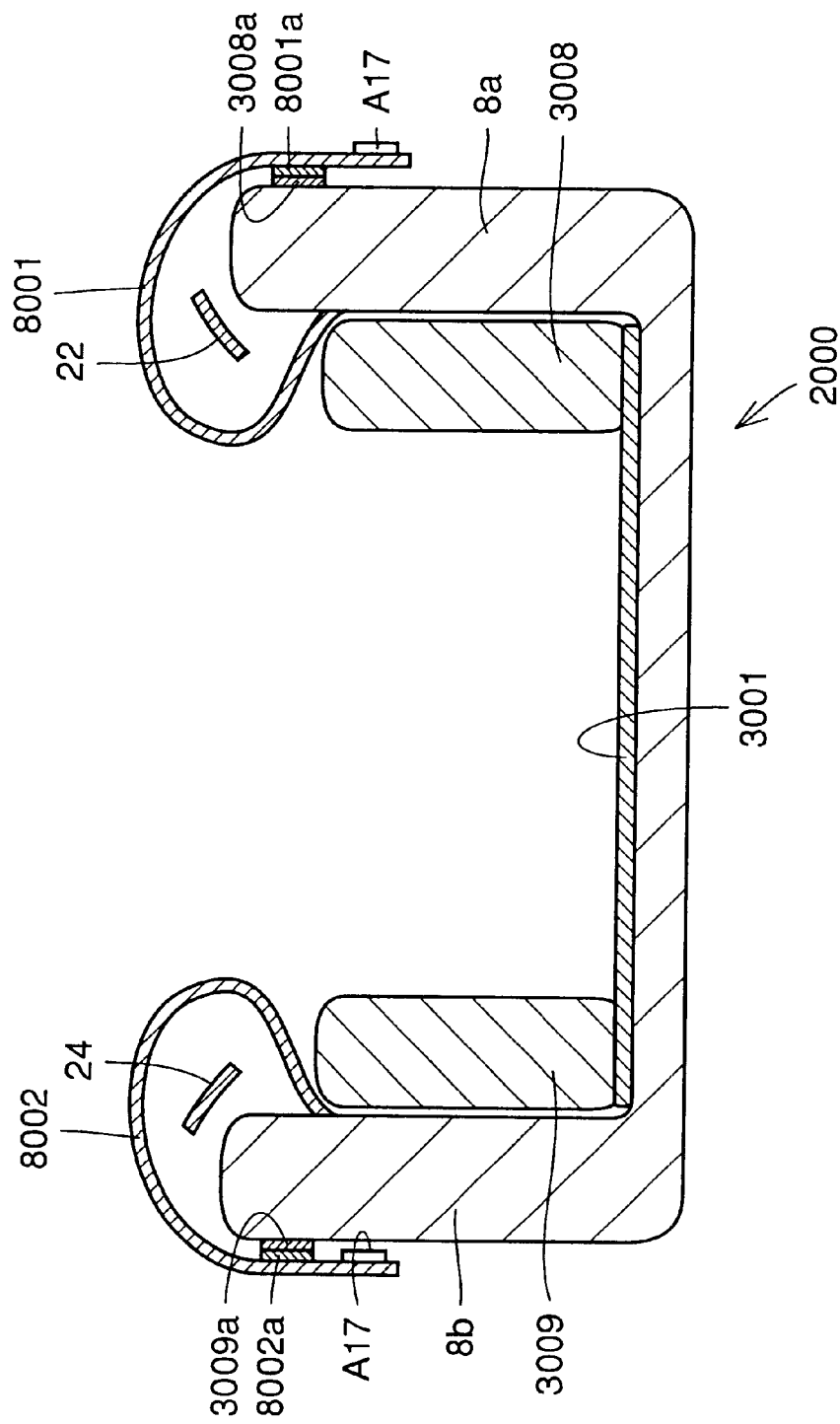
FIG. 59 is a sectional view, taken along the line X–X' in FIG. 56, showing a further embodiment.

While the body covers 8001 and 8002 are provided on the protector 3000 in the structure shown in FIG. 58, these body covers 8001 and 8002 may alternatively be provided on the juvenile safety car seat 2000, as shown in FIG. 59.

The snap fasteners A1 to A17 implementing attachment/detachment of the respective members in the aforementioned embodiment may be replaced with hook-and-loop fasteners, for example.

Application of the protector according to each of the second and third embodiments is not restricted to the juvenile safety car seat, but the protector is widely applicable to a general child-care instrument such as a playpen employed indoors or a baby carriage, for example.

According to the inventive juvenile safety car seat having the capacity-variable device, it is possible to protect a juvenile in any growth stage with a support space having a capacity most suitable to the size of the juvenile or child.

Consequently, the juvenile safety car seat can be improved in comfortability and safeness for the overall body of the juvenile. Further, it is possible to protect the baby with a composite multilayer structure by employing the protector, for further improving comfortability and safeness for a neonate or an infant whose brain is in a developmental stage.

The juvenile safety car seat according to the present invention can be provided with only one locking release device. The position of the locking release device, which is provided on the seat body, remains unchanged after the juvenile safety car seat is attached to the seat of the car. Consequently, handleability of the rotation device and the backward inclination device can be improved.

The juvenile safety car seat according to the present invention can be attached to the seat of the car at a proper angle regardless of the shape of the seat of the car. Consequently, the juvenile safety car seat can be improved in safeness on the basis of improvement of attachability.

According to the inventive protector, it is possible to support a juvenile of any growth stage with a support space having a capacity responsive to the habitus of the juvenile. Further, the protector enables double protection with the upper protector and the head protector particularly for a neonate or an infant whose brain is in a developmental stage. Consequently, the child-care instrument employing this protector can be improved in comfortability and safeness for the overall body of the juvenile.

According to the inventive protector for a child-care instrument, it is possible to support a juvenile of any growth stage with a support space having a capacity responsive to the growth of the juvenile.

The child-care instrument according to the present invention allows selection of a neonatal bed mode suitable to the habitus of a baby in a neonatal period, an infantile bed mode suitable to the habitus of an infantile baby and a child seat mode suitable to the habitus of a baby in childhood, whereby it is possible to apply a bed mode and a seat mode most suitable for the baby on the basis of the medical criteria for a baby in a neonatal period, infancy or childhood whose brain is in a developmental stage in particular for protecting the brain, the neck and respiration of the baby in a proper state.

The bed for a neonate according to the present invention enables application of a bed mode most suitable for a baby in a neonatal period on the basis of the medical criteria for a baby in a neonatal period whose brain is in a developmental stage in particular, for protecting the brain, the neck and respiration of the baby in a neonatal period in a proper state.

Although the present invention has been described and illustrated in detail, it is clearly understood that the same is by way of illustration and example only and is not to be taken by way of limitation, the spirt and scope of the present invention being limited only by the terms of the appended claims.

What is claimed is:

1. A child safety seat adapted to be secured to a car seat by a seat belt provided on said car seat, said child safety seat comprising a seat body including a backrest (6) for supporting a child's back, a headrest (10) movably supported by said seat body, said headrest (10) including a head guard wall (10A) rising from a plane of said headrest (10) for protecting the top of the head of a child in said safety seat, headrest moving means (100) operatively connected to said head rest (10) for controlling a position of said headrest (10) including said head guard wall (10A) relative to said backrest (6) and wherein said headrest moving means (100) includes an angular position control for controlling an angle of attachment of said headrest (10) relative to said backrest (6).

2. The child safety seat of claim 1, wherein said headrest moving means (100) includes a vertical position control for controlling a vertical position of said headrest (10) along said backrest (6).

3. The child safety seat of claim 1, further comprising a pair of laterally positioned sleeping supports (12, 14) for laterally supporting a child's head, particularly when a child is asleep in said safety seat, said sleeping supports including respective side walls extending laterally from said backrest, and side guard position control means (100, 300) for controlling a position of said side walls.

4. The child safety seat of claim 3, wherein said side guard position control means comprise a vertical mover (100) operatively connected to said sleeping supports (12, 14) for controlling a vertical position of said sleeping supports (12, 14) relative to said backrest (6).

5. The child safety seat of claim 3, wherein said side guard position control means comprise a sleeping support position controller (300) operatively connected to said sleeping supports (12, 14) for controlling a spacing between said laterally positioned sleeping supports (12, 14).

6. The child safety seat of claim 1, further comprising a pair of side guard walls (2a, 2b) rising laterally from respective sides of said backrest (6), and means for attaching and detaching said sleeping supports (12, 14) to said side guard walls.

7. A child safety seat adapted to be secured to a car seat by a seat belt provided on said car seat, said child safety seat comprising a seat body including a backrest (6) for supporting a child's back, a coupling member overlapping an upper region of said backrest (6), means for controlling a vertical position of said coupling member along said backrest, a head guard including a head guard wall (10a) rising from an upper end of said coupling member for protecting the top of a child's head in said safety seat, a pair of side guards including respective side guard walls rising from respective lateral sides of said coupling member for protecting a child's sides wherein said headrest moving means (100) includes an angular position control for controlling an angle of attachment of said headrest (10) relative to said backrest (6).

8. A child safety seat adapted to be secured to a car seat by a seat belt provided on said car seat, said child safety seat comprising a seat body including a seat base and a backrest supported on said seat base, a seat portion (8) supported on said seat base, a crotch belt operatively secured to said seat base for securing a child to said seat portion, and crotch belt position control means (400) for controlling the position of said crotchbelt relative to said seat base in a vertical direction.

* * * * *

UNITED STATES PATENT AND TRADEMARK OFFICE
CERTIFICATE OF CORRECTION

PATENT NO.     : 6,481,794 B1
DATED          : November 19, 2002
INVENTOR(S)    : Kassai et al.

It is certified that error appears in the above-identified patent and that said Letters Patent is hereby corrected as shown below:

Column 7,
Line 29, after "detachably", replace "provide" by -- provided --;
Lines 31 and 41, after "chilling", replace "against" by -- due to --;
Line 54, after "material", replace "feeding" by -- feeling --.

Column 12,
Line 59, after "locking", replace "pin" by -- hole --.

Signed and Sealed this

Thirteenth Day of May, 2003

JAMES E. ROGAN
*Director of the United States Patent and Trademark Office*